(12) United States Patent
Koyama et al.

(10) Patent No.: US 6,687,976 B1
(45) Date of Patent: Feb. 10, 2004

(54) METHOD OF MANUFACTURING MAGNETIC HEAD SLIDER AND METHOD OF FIXING MAGNETIC HEAD SLIDER

(75) Inventors: Akinori Koyama, Tokyo (JP); Kazuhiro Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 320 days.

(21) Appl. No.: 09/665,435

(22) Filed: Sep. 19, 2000

(30) Foreign Application Priority Data

Oct. 4, 1999 (JP) .......................................... 11-282959

(51) Int. Cl.$^7$ .......................... G11B 5/127; H04R 31/00
(52) U.S. Cl. ................ 29/603.12; 29/603.07; 29/603.08; 29/608.17; 29/608.18; 216/22; 216/41; 216/49; 360/234.3; 360/234.7; 430/320
(58) Field of Search ......................... 29/603.07, 603.08, 29/603.1, 603.12, 603.17, 603.18, 603.2, 743; 316/22, 41, 49; 360/234.3, 234.7; 430/320

(56) References Cited

U.S. PATENT DOCUMENTS

| | | | | |
|---|---|---|---|---|
| 5,207,467 A | * | 5/1993 | Smith | 294/64.1 |
| 5,359,485 A | | 10/1994 | Onishi | 360/121 |
| 5,406,694 A | * | 4/1995 | Ruiz | 29/603.07 |
| 5,694,677 A | * | 12/1997 | Tsunoda | 29/603.12 |
| 5,718,035 A | * | 2/1998 | Yamanaka et al. | 29/603.1 |
| 5,722,156 A | * | 3/1998 | Balfrey et al. | 29/603.08 |
| 6,081,991 A | * | 7/2000 | Tsunoda et al. | 29/603.08 |
| 6,094,808 A | * | 8/2000 | Mimura et al. | 29/743 |
| 6,102,023 A | * | 8/2000 | Ishiwata et al. | 125/13.01 |
| 6,129,855 A | * | 10/2000 | Sawada et al. | 216/22 |
| 6,135,522 A | * | 10/2000 | Su et al. | 294/64.1 |
| 6,202,289 B1 | * | 3/2001 | Yoshimura et al. | 29/603.12 |
| 6,295,719 B1 | * | 10/2001 | Strom | 29/603.12 |
| 6,343,415 B1 | * | 2/2002 | Okuda et al. | 29/740 |
| 6,374,479 B1 | * | 4/2002 | Sasaki et al. | 29/603.16 |

FOREIGN PATENT DOCUMENTS

| | | |
|---|---|---|
| JP | 05-022967 | 2/1993 |
| JP | 05-187288 | 6/1993 |
| JP | 6-236508 | 8/1994 |
| JP | 07-139902 | 5/1995 |
| JP | 8-315341 | 11/1996 |
| JP | 10-124821 | 5/1998 |
| JP | 10 124821 | 5/1998 |
| JP | 10-124821 A | 5/1998 |
| JP | 10-228617 | 8/1998 |
| JP | 11-142847 | 5/1999 |
| JP | 11-174995 | 5/1999 |
| WO | WO 97/16825 A1 | 5/1997 |

* cited by examiner

Primary Examiner—A. Dexter Tugbang
Assistant Examiner—Paul Kim
(74) Attorney, Agent, or Firm—Oliff & Berridge, PLC

(57) ABSTRACT

The invention provides a method of manufacturing a magnetic head slider and fixing a bar which improves fabrication accuracy without increasing manufacturing costs. After thin film magnetic head devices are formed on a wafer, the wafer is cut into bars each including two or more magnetic head sliders. The bars are carried and mounted onto a suction plater. A surface of each bar to be processed is brought into direct contact with a suction surface of the suction plate, and is positioned in a plane parallel to the suction surface. An adhesive is applied to the surface of a support substrate. The surfaces opposite to the surfaces to be processed are pressed against the adhesive. The adhesive is allowed to set. Adhesive thickness varies according to variations in thicknesses of the bars. Therefore, the surfaces of the bars to be processed can be kept aligned with a reference plane.

26 Claims, 15 Drawing Sheets

METHOD OF MANUFACTURING MAGNETIC HEAD SLIDER AND METHOD OF FIXING MAGNETIC HEAD SLIDER

BACKGROUND OF THE INVENTION

1. Field of the Invention

The invention relates to a method of manufacturing a magnetic head slider including a thin film magnetic head device for recording or reproducing information on/from a recording medium such as a hard disk, and a method of fixing a bar for processing the magnetic head slider.

2. Description of the Related Art

In a magnetic recording apparatus such as a hard disk drive, a thin film magnetic head device for recording or reproducing magnetic information is mounted on a magnetic head slider facing a recording surface of a magnetic recording medium.

The magnetic head slider is manufactured through the following steps as proposed in Japanese Unexamined Patent Application Publication No. Hei 10-228617, for example.

First, many thin film magnetic head devices are formed by thin film process on a substrate (wafer) made of a ceramic material, for example. Subsequently, the wafer is cut into a plurality of bars, each of which includes at least one magnetic head slider, by using a dicing saw or the like. Surfaces of a plurality of bars thus obtained are polished, and then slider rails having a predetermined shape are formed on each surface by etching process using photolithography, or the like. Each bar having the slider rails is further cut into separate magnetic head sliders.

In the step of forming the slider rails, a bar surface opposite to a surface to be processed (i.e., the surface on which the slider rails are to be formed) is bonded and the bar is fixed directly onto a support substrate made of ceramics or the like.

However, a method in which the bar surface opposite to the surface to be processed is fixed directly to the support substrate as mentioned above has the following disadvantage. When the method is applied to a plurality of bars in a batch process, variations in thicknesses among the bars cause variations in heights of the surfaces to be processed among the bars (i.e., distances between the surface of the support substrate and the surfaces to be processed). Therefore, some bars are in exposure focus and others are out of exposure focus, when so-called full-wafer printing for simultaneously exposing a plurality of bars to light takes place in the process using photolithography, for example. The bars out of exposure focus exhibit variations in shapes of the slider rails, because a desired size or shape of a photoresist pattern to be used as a mask is not obtained. As a result, the method has a problem of having an influence on properties of the magnetic head slider (e.g., the amount of head levitation that corresponds to a clearance between the magnetic head slider and the recording medium, and so on).

Instead of full-wafer printing, so-called step-and-repeat exposure for exposing the bars one by one to light can take place in order to solve the above-mentioned problem. However, a problem exists: manufacturing costs increase because a stepper is expensive. Another problem exists: manufacturing takes a long time because the bars one by one are exposed to light.

A method in which a plurality of bars is fixed in such a manner that their surfaces to be processed are located along a predetermined reference plane is proposed in Japanese Unexamined Patent Application Publication No. Hei 8-315341. Specifically, the surfaces of a plurality of bars to be processed are once bonded to a common glass plate, and then low-melting metal is poured around a plurality of bars and is left to be solidified. After the glass plate is removed, the bars are held by the low-melting metal with their surfaces exposed. The method allows the surfaces to be processed of the bars to have the same height (or level).

However, it is difficult for the method described in Japanese Unexamined Patent Application Publication No. Hei 8-315341 to precisely position the bars in a plane parallel to the reference plane (i.e., the surface of the glass plate). Thus, full-wafer printing for exposing a plurality of bars to light by using a common resist pattern may cause misalignment between the resist pattern and the bars. It is therefore difficult to form the slider rails having a precise shape. To cut each bar, into separate magnetic head sliders, the low-melting metal around each bar must be cut together with each bar. Consequently, the method also has a problem that the longevity of a cutting blade or the like decreases.

A method in which a plurality of bars is fixed to the support substrate in such a manner that a plurality of bars one by one is aligned in the plane parallel to the surface of the support substrate is proposed in Japanese Unexamined Patent Application Publication No. Hei 6-236508. Specifically, the surfaces to be processed of the bars are sucked and lifted by a suction holder, the support substrate placed on an XYZ table is appropriately positioned relative to the bars, and then the surfaces opposite to the surfaces to be processed of the bars thereof are fixed to the support substrate. However, the method described in Japanese Unexamined Patent Application Publication No. Hei 6-236508 has the same problem as the problem of Japanese Unexamined Patent Application Publication No. Hei 10-228617, because the surfaces opposite to the surfaces to be processed are fixed directly to the support substrate. That is, variations in thicknesses of the bars cause variations in heights of the surfaces to be processed. As a result, the method has a problem of having difficulty in forming the slider rails having a precise shape in the process using photolithography, or the like.

The invention is designed to overcome the foregoing problems. It is an object of the invention to provide a method of manufacturing a magnetic head slider and a method of fixing a bar which can improve fabrication accuracy without increasing manufacturing costs.

SUMMARY OF THE INVENTION

According to the invention, a method of fixing a bar to a predetermined support member in order to process a predetermined surface of the bar that is a long member including at least one magnetic head slider comprises the steps of: arranging a plurality of bars with their surfaces to be processed along a predetermined reference plane; and moving and placing the plurality of bars onto the support member while maintaining the relative positions of the bars, wherein the arranging step includes positioning of each of the plurality of bars in a plane parallel to the reference plane.

In a method of fixing a bar of the invention, the surfaces of a plurality of bars to be processed are located along the reference plane. Thus, all the surfaces of a plurality of bars to be processed can be brought into exposure focus even if, for example, full-wafer printing takes place in a process using, for instance, photolithography. Therefore, a slider rail can be precisely formed. Moreover, each bar is positioned in the plane parallel to the reference plane. Thus, it is easy to align a resist pattern for, for example, photolithography with the bar. Therefore, the slider rail can be precisely formed. Moreover, there is no need for step-and-repeat exposure for exposing the bars one by one to light. Therefore, the manufacturing time is reduced, and an expensive stepper is not required and thus manufacturing costs are reduced.

Desirably, in the step of transferring, the plurality of bars is fixed to the support member with an adhesive between the surfaces opposite to the surfaces to be processed of the plurality of bars and the support member. Thus, the thickness of the adhesive can vary according to variations in thicknesses of a plurality of bars. Therefore, a plurality of bars can be held with their surfaces to be processed aligned with the reference plane.

Desirably, the arranging step includes the steps of: bringing the surfaces of the plurality of bars to be processed into direct contact with the reference plane by using a reference member having a surface for determining the reference plane; and holding the plurality of bars by the reference member. Thus, the surfaces of a plurality of bars to be processed can be aligned with the reference plane by a simple method.

Desirably, the step of transferring further includes the steps of: applying an adhesive to the support member; bringing the surfaces opposite to the surfaces to be processed of the plurality of bars held by the reference member into contact with the adhesive; and separating the reference member from the plurality of bars after the adhesive sets.

Desirably, in the arranging step, the plurality of bars is positioned relative to the reference plane concurrently with observation of a predetermined mark formed on each of the bars. Thus, each bar can be precisely, simply positioned.

A method of fixing a bar of the invention may include, prior to the arranging step, the step of forming a protective film on at least one surface of the bar except the surface thereof to be processed. Thus, for example, a thin film magnetic head device formed on any surface other than the surface of the bar to be processed can be protected from damage due to the process (e.g., etching for photolithography) or the like.

Desirably, the plurality of bars includes a plurality of types of bars having different lengths. Thus, the bars can be cut from a wafer without wasting the bars, and therefore materials can be saved.

A method of manufacturing a magnetic head slider of the invention comprises the steps of: forming thin film magnetic head devices on a predetermined base; cutting the base into a plurality of bars, each of which includes at least one magnetic head slider on which the thin film magnetic head device is formed; arranging the plurality of bars with their predetermined surfaces along a predetermined reference plane; moving and placing the plurality of bars onto a predetermined support member while maintaining the relative positions of the bars, thereby supporting the plurality of bars by the support member; applying a predetermined process to the plurality of bars supported by the support member; and separating the bars into separate magnetic head sliders by cutting the bars, wherein the arranging step includes positioning of each of the plurality of bars in a plane parallel to the reference plane.

In a method of manufacturing a magnetic head slider of the invention, predetermined surfaces of a plurality of bars, i.e., the surfaces to be processed are located along the reference plane. Thus, all the surfaces of a plurality of bars to be processed can be brought into exposure focus even if, for example, full-wafer printing takes place in, for instance, photolithography. Therefore, the slider rail can be precisely formed. Moreover, each bar is positioned in the plane parallel to the reference plane. Thus, it is easy to align a resist pattern for, for example, full-wafer printing with the bar. Therefore, the slider rail can be precisely formed. Moreover, there is no need for step-and-repeat exposure for exposing the bars one by one to light. Therefore, the manufacturing time is reduced, and an expensive stepper is not required and thus manufacturing costs are reduced.

Other and further objects, features and advantages of the invention will appear more fully from the following description.

DETAILED DESCRIPTION OF THE PREFERRED EMBODIMENTS

Configuration of Magnetic Head Slider

Firstly, the description is given with reference to FIGS. 1 to 5 with regard to the structure of a magnetic head slider to which a method of manufacturing a magnetic head slider and a method of fixing a bar according to an embodiment of the invention are applied.

Figure 1:
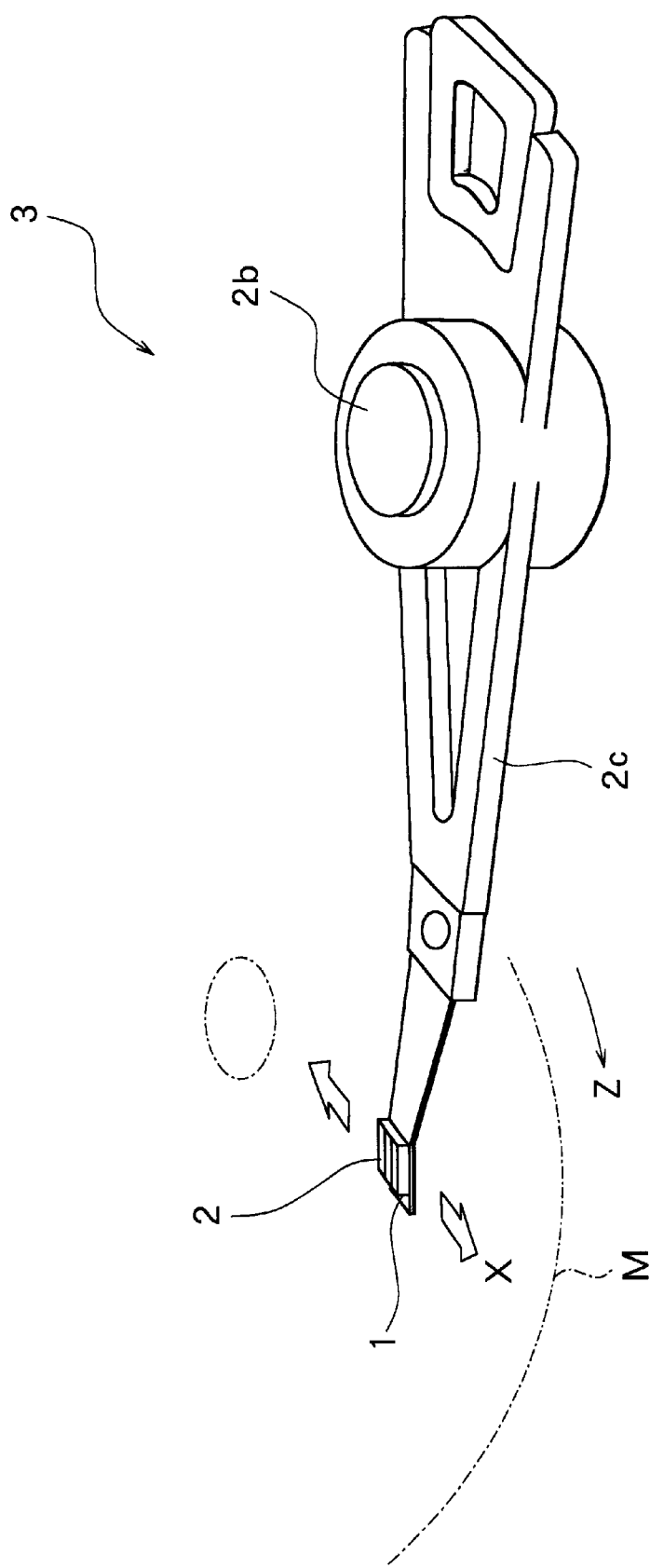
FIG. 1 is a perspective view of the configuration of an actuator arm comprising a magnetic head slider to which a method of manufacturing a magnetic head slider and a method of fixing a bar according to an embodiment of the invention are applied.

FIG. 1 shows the configuration of an actuator arm 3 comprising a magnetic head slider 2 to which the method of manufacturing a magnetic head slider and the method of fixing a bar according to the embodiment are applied. The actuator arm 3 is used in a hard disk drive (not shown) or the like, for example. The actuator arm 3 has the magnetic head slider 2 on which a thin film magnetic head device 1 is formed. For example, the magnetic head slider 2 is mounted on the end of an arm 2c rotatably supported by a supporting pivot 2b. The arm 2c is rotated by driving force of a voice coil motor (not shown), for example. Thus, the magnetic head slider 2 moves in a direction x in which the magnetic head slider 2 crosses a track line along a recording surface of a magnetic recording medium M such as a hard disk (a lower surface of the recording surface in FIG. 1). For example, the magnetic recording medium M rotates in a direction z substantially perpendicular to the direction x in which the magnetic head slider 2 crosses the track line. The magnetic recording medium M rotates and the magnetic head slider 2 moves in this manner, whereby information is recorded on the magnetic recording medium M or recorded information is read out from the magnetic recording medium M.

Figure 2:
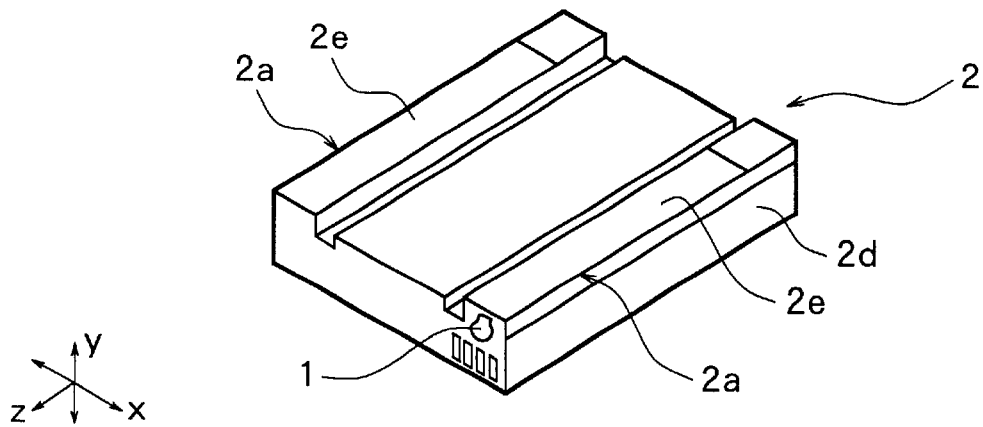
FIG. 2 is a perspective view of the configuration of the magnetic head slider of the actuator arm shown in FIG. 1.

FIG. 2 shows the configuration of the magnetic head slider 2 shown in FIG. 1. The magnetic head slider 2 has a block-shaped base 2d made of $Al_2O_3$—TiC (altic), for example. The base 2d is substantially hexahedral, for instance. One face of the hexahedron (an upper face in FIG. 2) closely faces the recording surface of the magnetic recording medium M (see FIG. 1). Two parallel slider rails 2a are formed on a surface facing the recording surface of the magnetic recording medium M. The surface of each slider rail 2a is called an air bearing surface (ABS) 2e. When the magnetic recording medium M rotates, airflow generated between the recording surface of the magnetic recording medium M and the air bearing surface 2e allows the magnetic head slider 2 to slightly move away from the recording surface in a direction y opposite to the recording surface. Thus, a constant clearance is created between the air bearing surface 2e and the magnetic recording medium M. The thin film magnetic head device 1 is formed on one side (the left side in FIG. 2) adjacent to the air bearing surface 2e of the base 2d.

Figure 3:
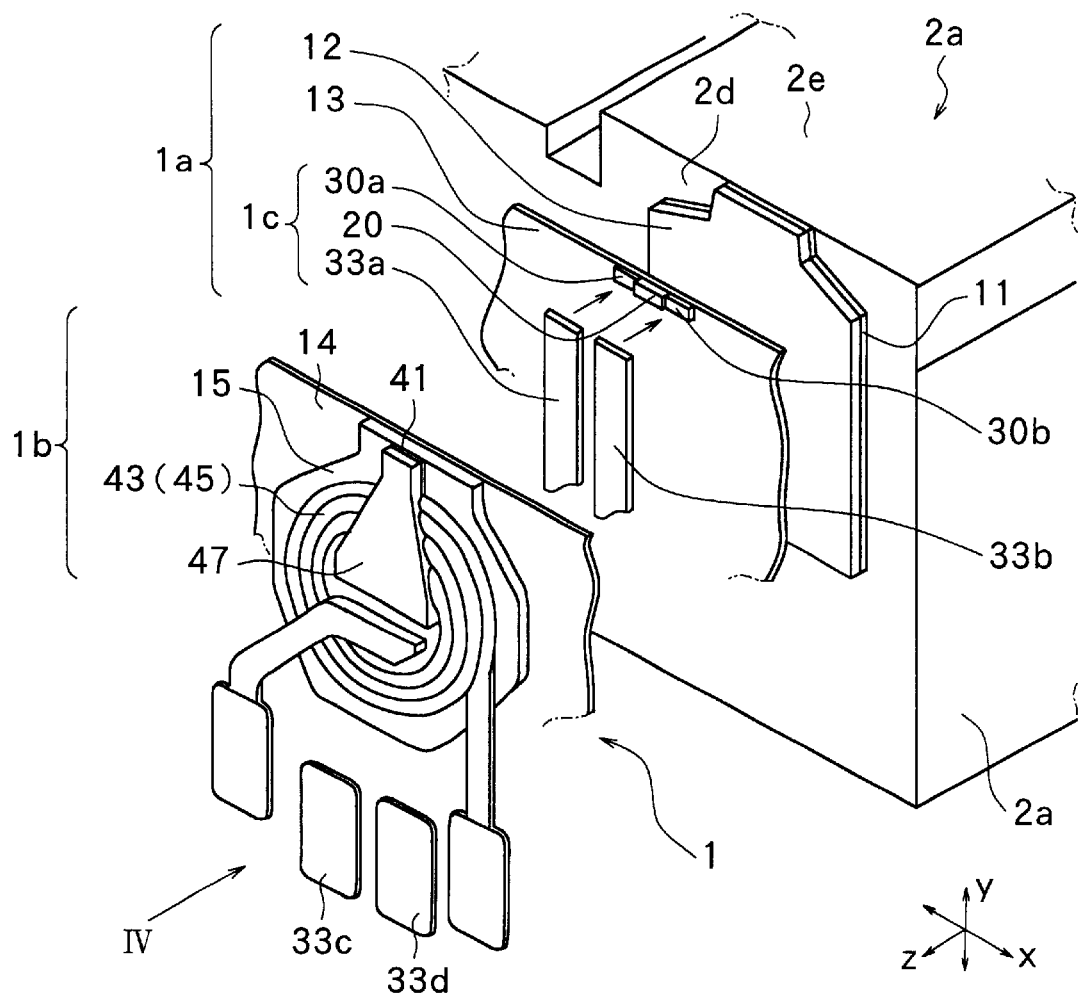
FIG. 3 is an exploded perspective view of the configuration of a thin film magnetic head device mounted on the magnetic head slider shown in FIG. 2.
Figure 4:
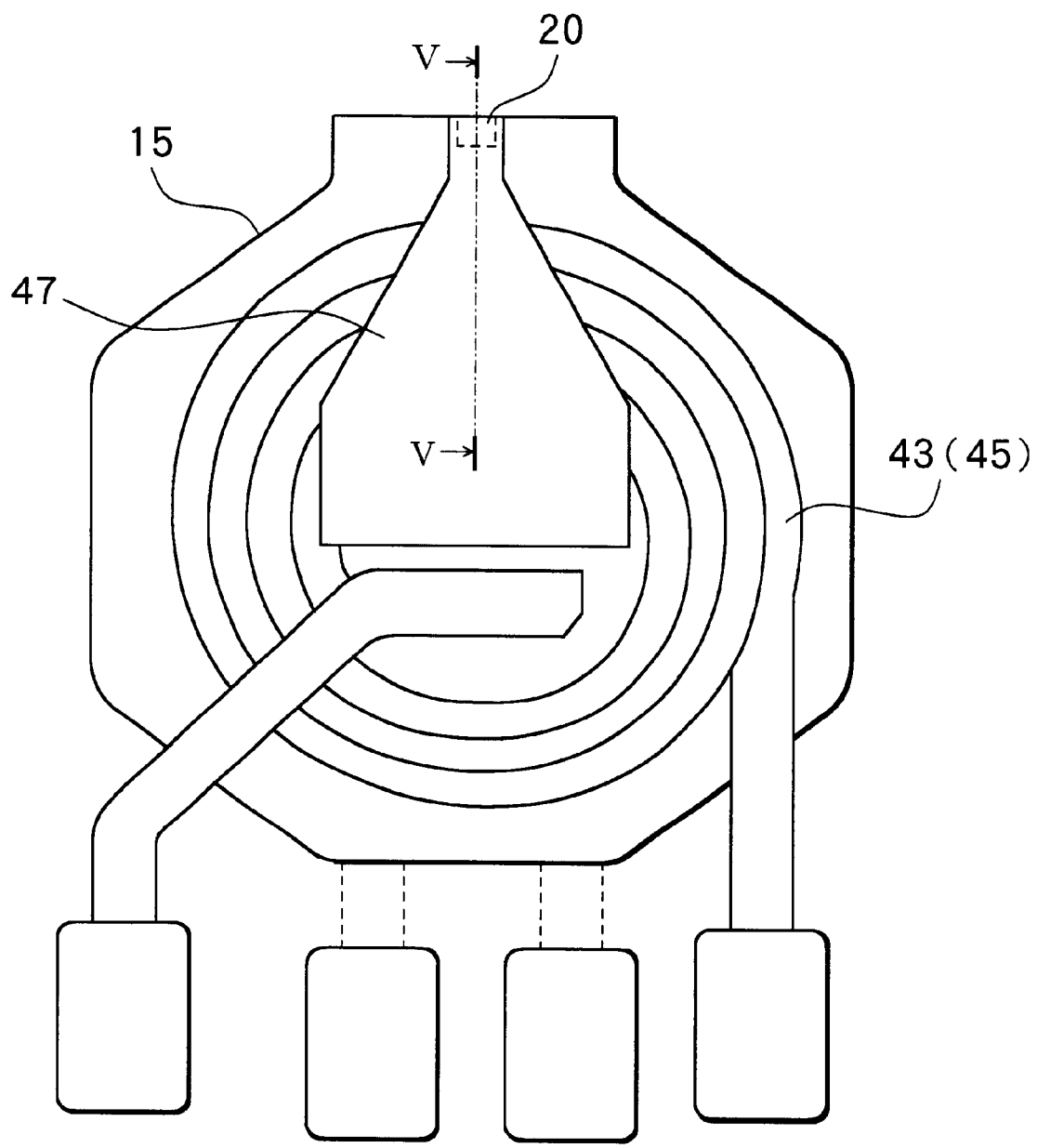
FIG. 4 is a plan view of the structure of the thin film magnetic head shown in FIG. 3 viewed from the direction of the arrow IV of FIG. 3.
Figure 5:
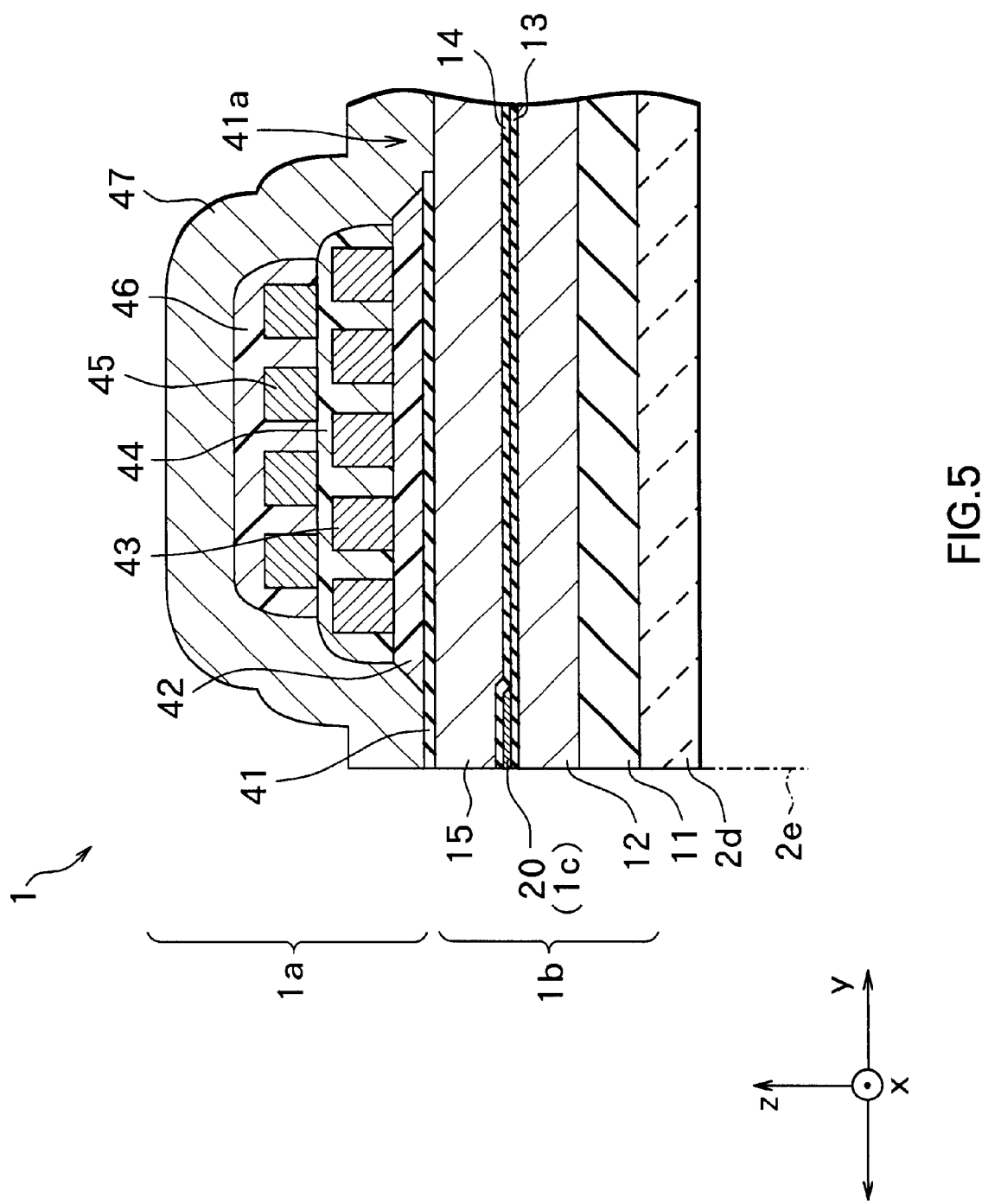
FIG. 5 is a sectional view of the structure of the thin film magnetic head shown in FIG. 3 viewed from the direction of the arrows along the line V—V of FIG. 4.

FIG. 3 is an exploded view of the structure of the thin film magnetic head device 1. FIG. 4 shows a plan structure viewed from the direction of the arrow IV of FIG. 3. FIG. 5 shows a sectional structure viewed from the direction of the arrows along the line V—V of FIG. 4. The thin film magnetic head device 1 has an integral structure comprising a reproducing head 1a for reproducing magnetic information recorded on the magnetic recording medium M (see FIG. 1) and a recording head 1b for recording magnetic information on the magnetic recording medium M.

As shown in FIGS. 3 and 5, for example, the reproducing head 1a has a stacked structure comprising an insulating layer 11, a bottom shield layer 12, a bottom shield gap layer 13, a top shield gap layer 14 and a top shield layer 15, which are stacked in this order on the base 2d on the side close to the air bearing surface 2eFor example, the insulating layer 11 is 2 μm to 10 μm in thickness along the direction of stack (hereinafter referred to as a thickness) and is made of $Al_2O_3$ (alumina). For example, the bottom shield layer 12 is 1 μm to 3 μm in thickness and is made of a magnetic material such as NiFe (nickel-iron alloy: permalloy). For example, the bottom shield gap layer 13 and the top shield gap layer 14 are each 10 nm to 100 nm in thickness and are made of $Al_2O_3$ or AlN (aluminum nitride). For example, the top shield layer 15 is 1 μm to 4 μm in thickness and is made of a magnetic material such as NiFe. The top shield layer 15 also functions as a bottom pole of the recording head 1b.

An MR (magnetoresistive) element 1c is buried between the bottom shield gap layer 13 and the top shield gap layer 14. The MR element 1c is an element for reading information written on a magnetic recording medium (not shown) and is located on the side close to the air bearing surface 2e. The MR element 1c includes an MR film 20 made of an AMR (anisotropic magnetoresistive) film or a GMR (giant magnetoresistive) film. The AMR film has a single-layer structure including a magnetic layer made of NiFe, for example. The GMR film has a multilayered structure including, in addition to a soft magnetic layer, a ferromagnetic layer made of, for example, CoFe (iron-cobalt alloy), an antiferromagnetic layer made of, for example, MnPt (manganese-platinum alloy), a nonmagnetic metal layer made of, for example, Cu (copper), and so on.

Magnetic domain control films 30a and 30b made of, for example, a hard magnetic material are formed on both sides of the MR film 20 along the direction of a track width (X direction in FIG. 3). The magnetic domain control films 30a and 30b are films for applying a bias magnetic field to the MR film 20 in a fixed direction and thereby preventing Barkhausen noise. A pair of lead layers 33a and 33b facing each other with the MR film 20 in between in the direction of the track width is electrically connected to the MR film 20. Similarly to the MR film 20, the lead layers 33a and 33b are formed between the bottom shield gap layer 13 and the top shield gap layer 14. The lead layers 33a and 33b are made of metal such as tantalum (Ta).

The lead layers 33a and 33b extend in the direction opposite to the air bearing surface 2e. The lead layers 33a and 33b are electrically connected to output terminals 33c and 33d, which are formed into a predetermined pattern on the top shield gap layer 14, through an opening (not shown) formed in the top shield gap layer 14.

For example, as shown in FIGS. 3 to 5, the recording head 1b has a write gap layer 41 of 0.1 μm to 0.5 μm thick made of an insulating film such as $Al_2O_3$ on the top shield layer 15. The write gap layer 41 has an opening 41a at the position corresponding to the center of thin film coils 43 and 45 to be described later. The thin film coils 43 of 1 μm to 3 μm thick and a photoresist layer 44 for coating the thin film coils 43 are formed on the write gap layer 41 with a photoresist layer 42 having a thickness of 1.0 μm to 5.0 μm for determining a throat height in between. The thin film coils 45 of 1 μm to 3 μm thick and a photoresist layer 46 for coating the thin film coils 45 are formed on the photoresist layer 44. In the embodiment, the description is given with regard to an example in which two thin film coil layers are stacked. However, the number of thin film coil layers may be one, or three or more.

A top pole 47 of about 3 μm thick made of a magnetic material having high saturation magnetic flux density, such as NiFe or FeN (iron nitride), is formed on the write gap layer 41 and the photoresist layers 42, 44 and 46. The top pole 47 is in contact with and magnetically coupled to the top shield layer 15 through the opening 41*a* of the write gap layer 41 located at the position corresponding to the center of the thin film coils 43 and 45. Although not shown in FIGS. 3 to 5, an overcoat layer of 20 μm to 30 μm thick made of, for example, Al$_2$O$_3$ is formed on the top pole 47 so as to coat the overall surface. Thus, the recording head 1*b* generates a magnetic flux between the bottom pole, i.e., the top shield layer 15 and the top pole 47 by a current passing through the thin film coils 43 and 45 and magnetizes the magnetic recording medium M (see FIG. 1) by the magnetic flux generated near the write gap layer 41, thereby recording information.

The thin film magnetic head device 1 having the above-described structure functions in the following manner. That is, a current is passed through the thin film coils 43 and 45 of the recording head 1*b*, whereby the magnetic flux for writing is generated and thus information is recorded on the magnetic recording medium M (see FIG. 1). A sense current is passed through the MR film 20 of the reproducing head 1*a* and thus a change in resistance due to a signal magnetic field from the magnetic recording medium M is detected, whereby information recorded on the magnetic recording medium M is read out.

Configuration of bar Fixing Apparatus

Figure 6:
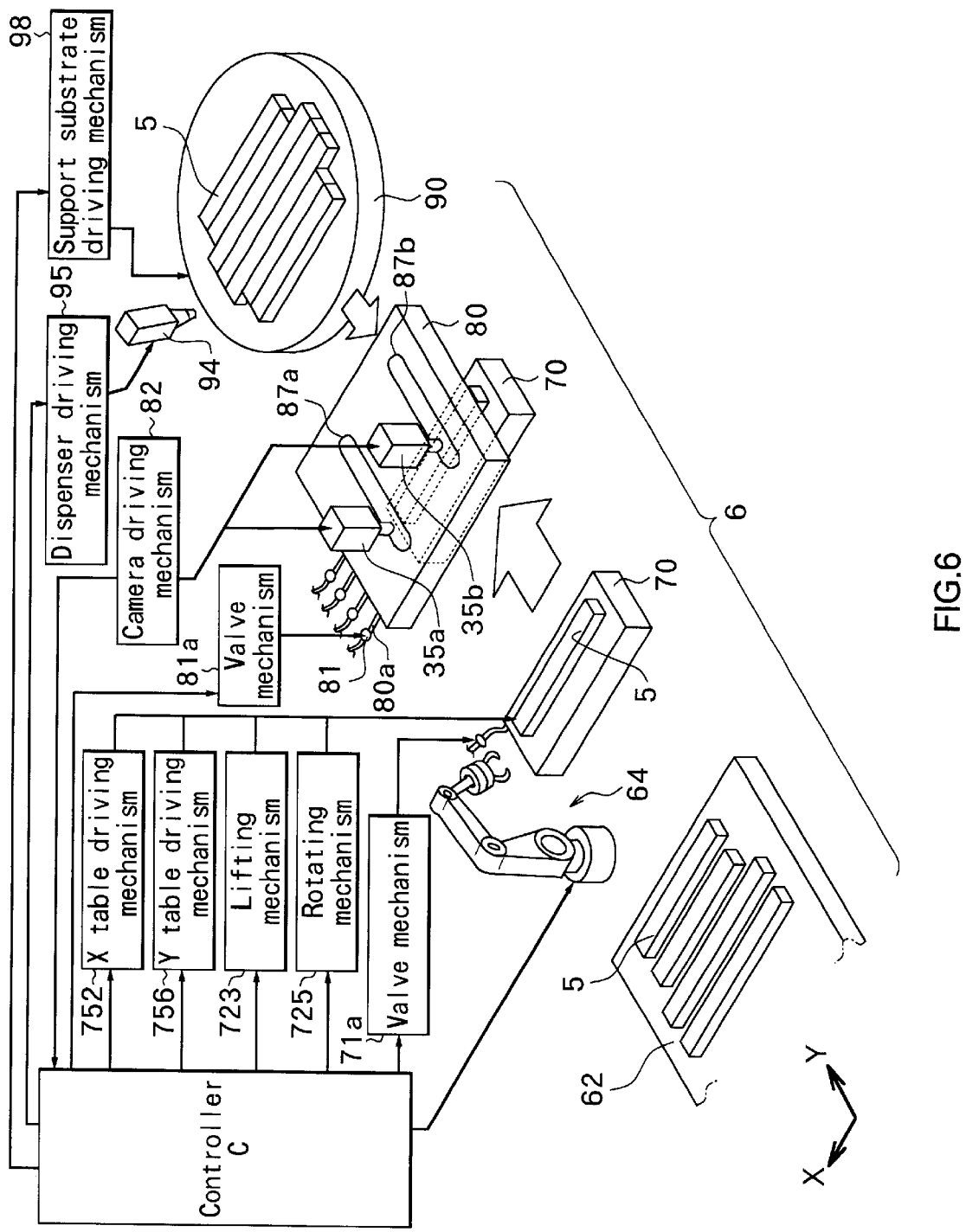
FIG. 6 is an illustration of a general configuration of a fixing apparatus for use in the method of manufacturing a magnetic head slider and the method of fixing a bar according to the embodiment of the invention.

FIG. 6 shows a basic configuration of a bar fixing apparatus for use in the method of manufacturing a magnetic head slider according to the embodiment. A bar fixing apparatus 6 is configured so that a plurality of bars 5 is arranged in such a manner that their surfaces to be processed are located along a predetermined reference plane and so that the bars 5 are positioned in a plane parallel to the above-mentioned reference plane. As shown in FIG. 6, the bar fixing apparatus 6 performs necessary operation while carrying the bars 5 in one direction in a horizontal surface (from the lower left to the upper right in FIG. 6). In the following description, the direction in which the bar fixing apparatus 6 carries the bars 5 is referred to as a Y direction, and the direction perpendicular to the Y direction in the horizontal surface is referred to as an X direction.

The bar fixing apparatus 6 has a palette 62 for horizontally placing a plurality of bars 5 thereon along the Y direction, a robot 64 for lifting out the bars 5 one by one placed on the palette 62, a carrier 70 for receiving and carrying the bars 5 one by one lifted out by the robot 64, a suction plate 80 for sucking and holding a plurality of bars 5 carried by the carrier 70, and a support substrate 90 for supporting the bars 5 transferred from the suction plate 80. The support substrate 90 holds a plurality of bars 5 in a process using photolithography to be described later. Mechanisms for driving the robot 64, the carrier 70 and the support substrate 90 are driven under the control of a controller C.

The palette 62 is a plate-shaped member having an area large enough to place a predetermined number of bars 5 (e.g., fifty bars 5) thereon. The robot 64 performs a series of operations of grasping the bars one by one on the palette 62 and placing the bars 5 one by one onto the carrier 70. The robot 64 may have any specific configuration as long as the robot 64 can perform the above-mentioned operation.

Figure 7:
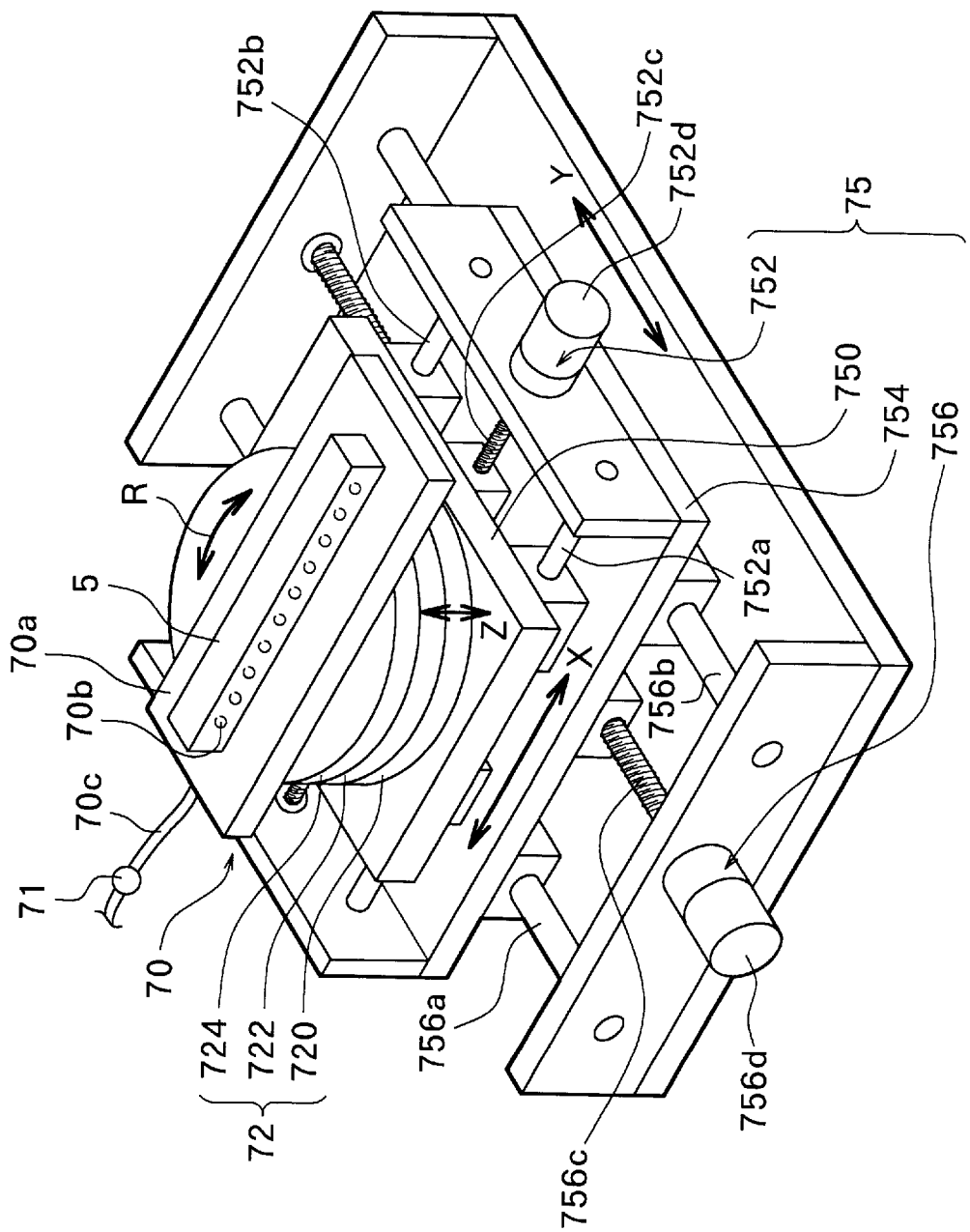
FIG. 7 is a perspective view of a carrier of the fixing apparatus shown in FIG. 6 and a mechanism for driving the carrier.

FIG. 7 is a perspective view of an example of the configurations of the carrier 70 and a driving mechanism for driving the carrier 70. As shown in FIG. 7, the carrier 70 comprises a long block having a placing surface 70*a* having an area large enough to place one bar 5 thereon. A line of suction holes 70*b* is formed in the placing surface 70*a* along a longitudinal direction of the carrier 70. The suction holes 70*b* are coupled to a pipe 70*c* extending outward from the carrier 70. The pipe 70*c* has a valve 71 which is opened or closed under the control of a valve driving mechanism 71*a*. The carrier 70 is configured so as to suck and hold the bar 5 on the placing surface 70*a* by opening the valve 71 and to stop sucking the bar 5 by closing the valve 71.

The carrier 70 is mounted on a lifting and rotating actuator 72 which can vertically move up and down and can rotate in the horizontal surface. The lifting and rotating actuator 72 is mounted on an XY table 75 which can move in the horizontal surface. The lifting and rotating actuator 72 comprises a base 720, an up-and-down plate 722 which is moved up and down on the base 720 by a lifting mechanism 723 (see FIG. 6) including, for example, worm gearing, and a rotating plate 724 which is rotated on the up-and-down plate 722 by a rotating mechanism 725 (see FIG. 6) including, for example, a gear train. The XY table 75 comprises an X table 750 for supporting the lifting and rotating actuator 72, an X table driving mechanism 752 for moving the X table 750 straight ahead in the X direction, a Y table 754 for mounting the X table 750 and the X table driving mechanism 752, and a Y table driving mechanism 756 for moving the Y table 754 straight ahead in the Y direction. The X table driving mechanism 752 has a pair of guide shafts 752*a* and 752*b* extending in the X direction, a ball screw 752*c* extending in the X direction, and a motor 752*d* for rotating the ball screw 752*c*. Similarly, the Y table driving mechanism 756 has a pair of guide shafts 756*a* and 756*b* extending in the Y direction, a ball screw 756*c* extending in the Y direction, and a motor 756*d* for rotating the ball screw 756*c*. The Y table 754 moves within a range of from a position in close proximity to the robot 64 to a position under the suction plate 80. The above-mentioned lifting and rotating actuator 72 may comprise a combination of a mechanism for relatively rough positioning and a mechanism for fine positioning, but the detailed description thereof is omitted.

Figure 8:
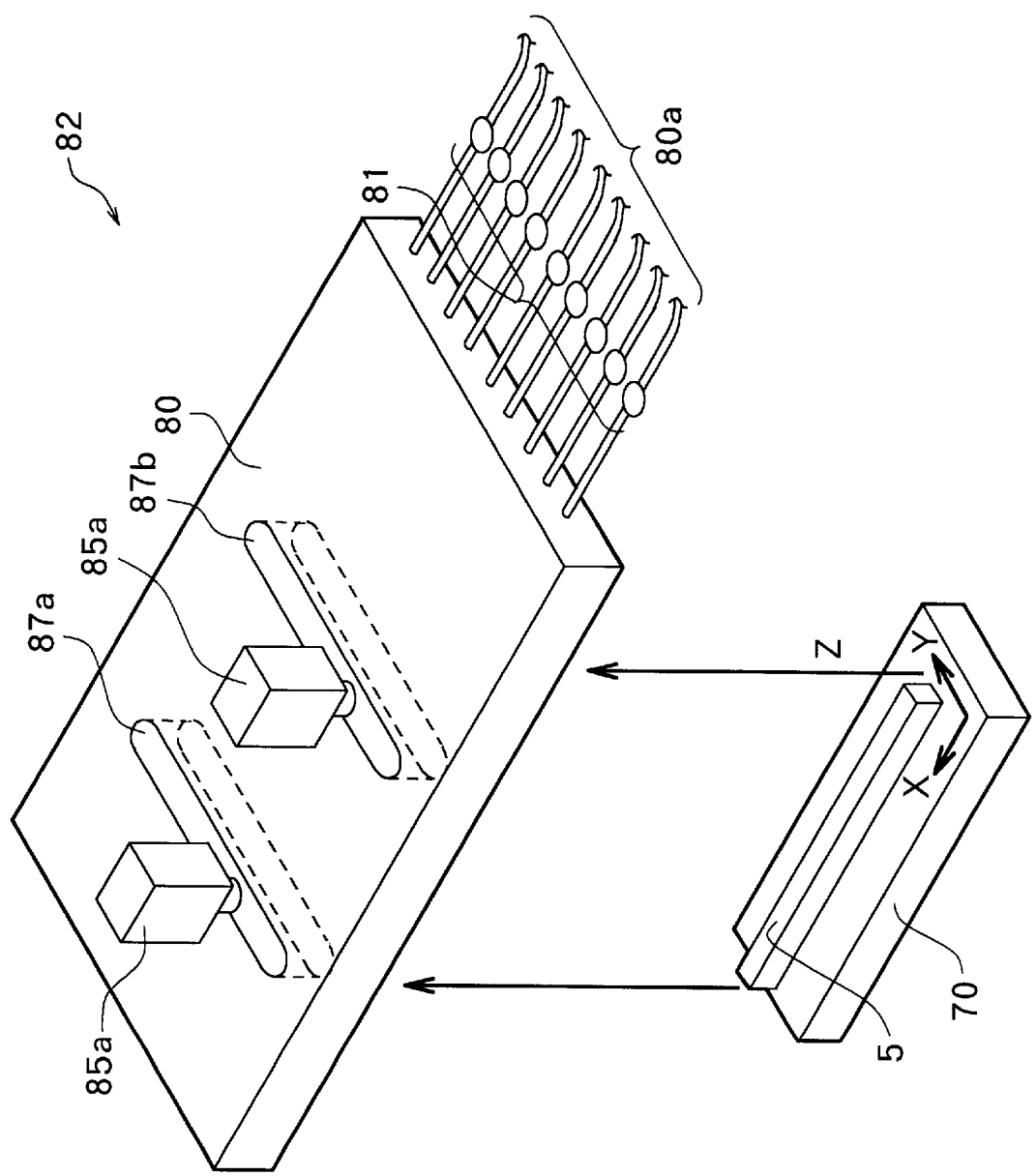
FIG. 8 is a perspective view of a suction plate of the fixing apparatus shown in FIG. 6.

FIG. 8 is a perspective view of an example of the configuration of the suction plate 80. The suction plate 80 is a plate-shaped member, which has an area large enough to hold, for example, fifty bars 5 and is made of, for example, stainless steel. A lower surface of the suction plate 80 is a smooth surface. A plurality of lines of suction holes (not shown) is formed in the lower surface of the suction plate 80. The number of the lines of suction holes corresponds to the number of the bars 5 to be sucked. The lines of suction holes are coupled to pipes 80*a* independent of one another for each line. Each pipe 80*a* has each of valves 81 which are opened or closed independently of one another under the control of a valve mechanism 81*a*. Thus, suction by the suction holes can be turned on or off for each line.

Two slits 87*a* and 87*b*, which are cut through the suction plate 80 in the direction of thickness of the suction plate 80, are formed in the suction plate 80 in order to observe a suction position of the bar 5, and the like. The slits 87*a* and 87*b* are formed at the positions corresponding to both ends of the bar 5 to be sucked by the suction plate 80 in the longitudinal direction of the bar 5 (i.e., the X direction). The slits 87a and 87b extend long in the direction of arrangement of the bars 5 (i.e., the Y direction). Two cameras 85a and 85b are located over the suction plate 80 with a predetermined space between in the X direction so that the cameras 85a and 85b can observe both ends of the bar 5 (to be sucked by the suction plate 80) in the longitudinal direction of the bar 5 through the slits 87a and 87b. The cameras 85a and 85b are moved along the slits 87a and 87b by a camera driving mechanism 82 (see FIG. 6).

As shown in FIG. 6, the support substrate 90 is a ceramic substrate having, for example, a wafer shape and having an area large enough to mount a predetermined number of bars 5 (e.g., fifty bars 5) thereon. The surface of the support substrate 90 is coated with a material e.g., polyimide that can resist, for example, several photolithography processes and is difficult to dissolve in alcohol and acetone. Specific examples of polyimide for use in coating include Semicofine™ made by Toray Industries, Inc., and so on. A dispenser 94 is provided near the support substrate 90 in order to apply an adhesive to the surface of the support substrate 90. The dispenser 94 is configured so as to move along the surface of the support substrate 90 by a known dispenser driving apparatus 95 and to dispense a liquid adhesive from the end thereof. The adhesive will be described later.

The support substrate 90 can be moved in the Y direction by a support substrate driving mechanism 98. The support substrate 90 can horizontally move between the position under the suction plate 80 and the position away from the suction plate 80. With the support substrate 90 under the suction plate 80, a plurality of bars 5 held by the suction plate 80 is moved and placed onto the support substrate 90. When the bars 5 are moved and placed onto the support substrate 90, the support substrate 90 is driven up and down, for example, a few millimeters by the support substrate driving mechanism 98 in order to bring the adhesive (to be described later) on the support substrate 90 into contact with the bars 5 held by the suction plate 80.

The support substrate 90 corresponds to a specific example of "a support member" of the invention. The suction plate 80 corresponds to a specific example of "a reference member" of the invention. A suction surface (lower surface) of the suction plate 80 corresponds to a specific example of "a reference plane" of the invention. The carrier 70 corresponds to a specific example of "a carrier" of the invention.

Method of Manufacturing Magnetic Head Slider

Figure 9:
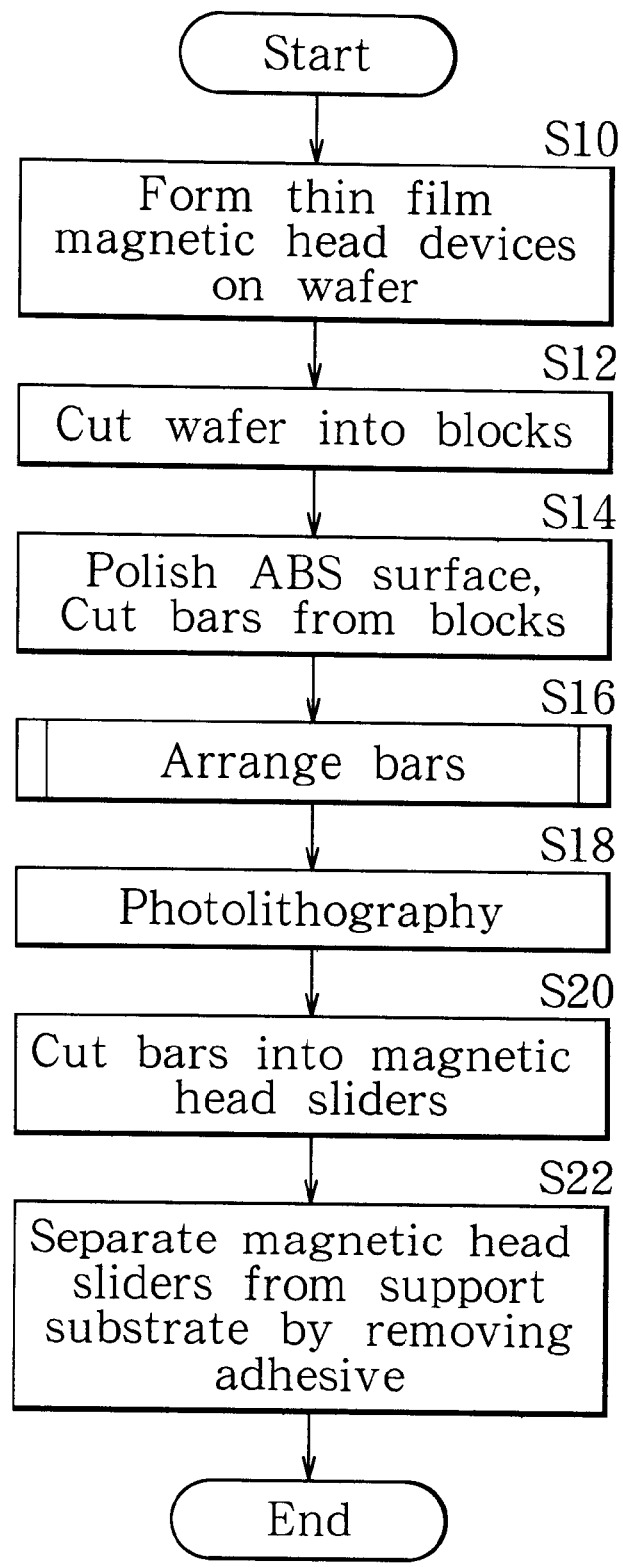
FIG. 9 is a flow chart of the method of manufacturing a magnetic head slider according to the embodiment of the invention.
Figure 10A:
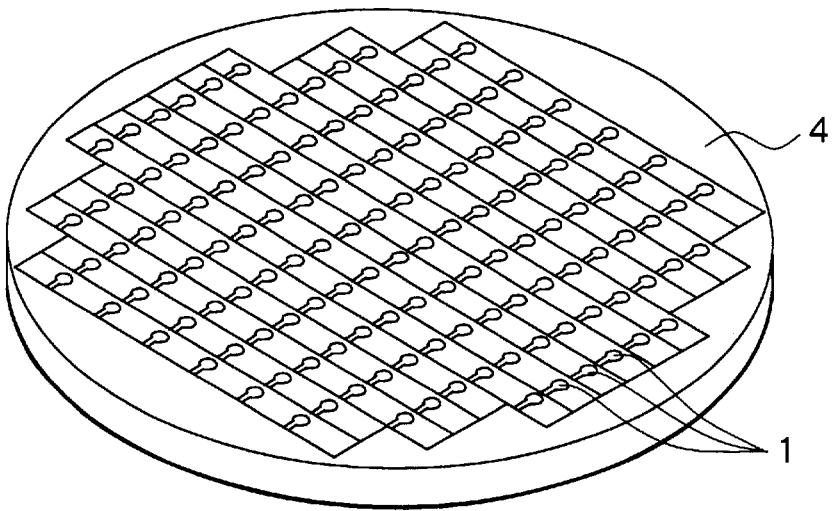
FIGS. 10A and 10B are perspective views of steps for describing the step of forming the thin film magnetic head devices on a wafer and the step of cutting the wafer into blocks in the manufacturing method shown in FIG. 9.

FIG. 9 is a flow chart of the method of manufacturing a magnetic head slider. FIGS. 10A and 10B and FIGS. 11A to 11C are perspective views of steps for describing the manufacturing method shown in FIG. 9. As shown in FIG. 10A, many thin film magnetic head devices 1 are formed on a wafer 4 of 3 in. to 6 in. thick made of, for example, $Al_2O_3$—TiC by using thin film process or the like (step S10).

Thin film process in step S10 will be briefly described with reference to FIGS. 3 to 5.

First, for example, the insulating layer 11 made of an insulating material such as $Al_2O_3$ is formed on the above-mentioned wafer 4 by sputtering or the like. Then, the bottom shield layer 12 made of a magnetic material such as NiFe is selectively formed on the insulating layer 11 by sputtering, for example. Subsequently, an $Al_2O_3$ film is deposited on the bottom shield layer 12 by sputtering, for example. The $Al_2O_3$ film is heated, whereby the highly insulating bottom shield gap layer 13 is formed.

Next, a stacked film for forming the MR film 20 is formed on the bottom shield gap layer 13 by, for example, sputtering, and then a photoresist pattern is selectively formed on the stacked film. After that, the stacked film is etched by, for example, ion milling using the photoresist pattern as a mask, whereby the MR film 20 having a predetermined plan shape and size is formed. Then, the magnetic domain control films 30a and 30b and the lead layers 33a and 33b are formed on the bottom shield gap layer 13 by sputtering, for example.

Next, the top shield gap layer 14 is formed on the bottom shield gap layer 13, the MR film 20 and the lead layers 33a and 33b in the same manner as the bottom shield gap layer 13. After that, the top shield layer 15 is selectively formed on the top shield gap layer 14 by sputtering, for example.

After forming the top shield layer 15, the write gap layer 41 made of an insulating material such as $Al_2O_3$ is formed on the top shield layer 15 by sputtering, for example. After that, the photoresist layer 42 is selectively formed on the write gap layer 41 by using photolithography. Then, the thin film coils 43 are selectively formed on the photoresist layer 42 by plating or sputtering, for example. Subsequently, the photoresist layer 44 is selectively formed on the photoresist layer 42 and the thin film coils 43 in the same manner as the photoresist layer 42. Then, the thin film coils 45 are selectively formed on the photoresist layer 44 in the same manner as the thin film coils 43. Furthermore, the photoresist layer 46 is selectively formed on the photoresist layer 44 and the thin film coils 45 in the same manner as the photoresist layer 42.

After forming the photoresist layer 46, the write gap layer 41 is partly etched, whereby the opening 41a is formed near the center of the thin film coils 43 and 45. After that, the top pole 47 made of a magnetic material such as NiFe or FeN is formed on the write gap layer 41 and the photoresist layers 44 and 46 by sputtering, for example. Subsequently, the write gap layer 41 and a part of the top shield layer 15 are etched by, for example, ion milling using the top pole 47 as a mask. After that, an overcoat layer (not shown) made of, for example, $Al_2O_3$ is formed on the top pole 47 by sputtering, for example.

In the above-described manner, many thin film magnetic head devices 1 are formed on the wafer 4 as shown in FIG. 10A.

Figure 10B:
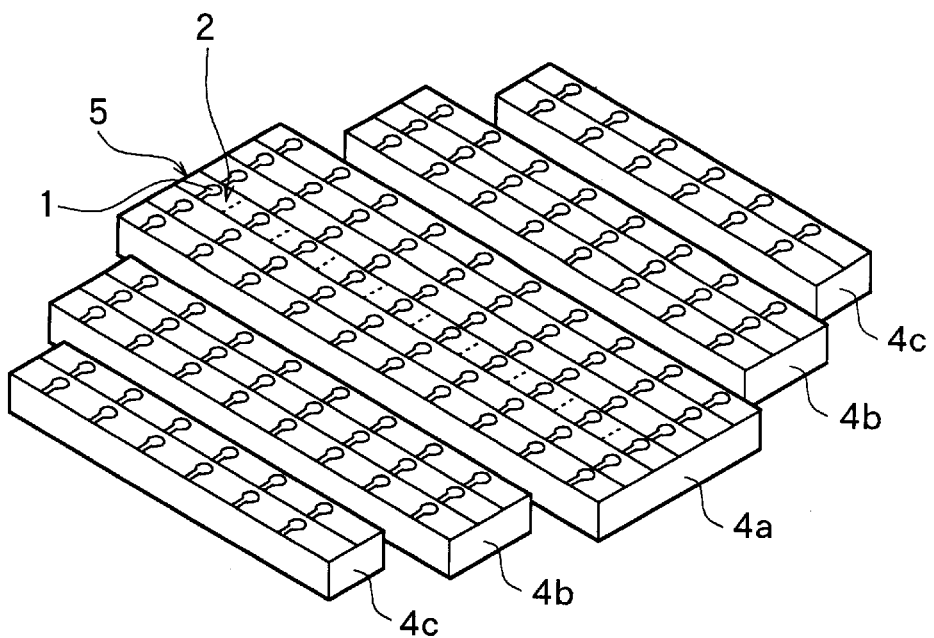

Subsequently, as shown in FIG. 10B, the wafer 4 is cut into some blocks, i.e., blocks 4a, 4b and 4c having three types of sizes, for example (step S12). Each of the blocks 4a, 4b and 4c corresponds to an integral structure of the stacked bars 5 having the same length. Each bar 5 corresponds to an integral structure of a plurality of magnetic head sliders 2, each of which has at least one thin film magnetic head device 1.

Figure 11A:
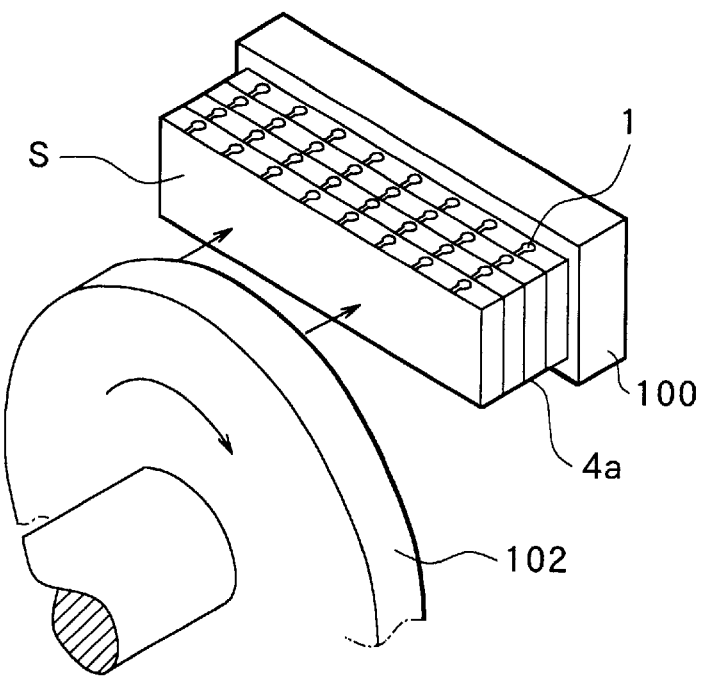
FIGS. 11A to 11C are perspective views of steps for describing a method of cutting bars from the blocks and a method of polishing the bars in the manufacturing method shown in FIG. 9.
Figure 11B:
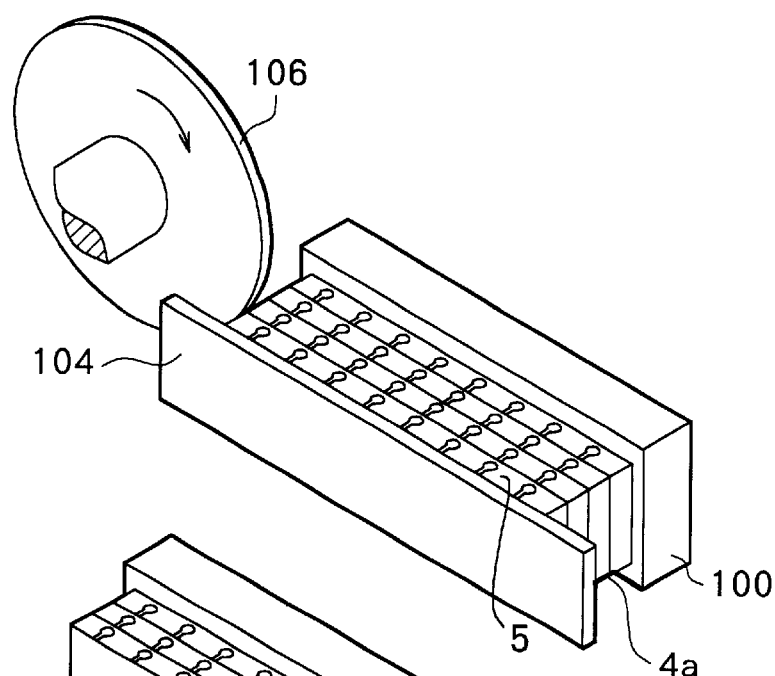

Next, the bars 5 are cut from the blocks 4a, 4b and 4c and are lapped (step S14). Specifically, as shown in FIG. 11A, an end surface of one of the bars 5 included in the block 4a, i.e., an end surface corresponding to the air bearing surface is polished by a grinding wheel 102. At this time, the block 4a is fixed to a fixing jig 100 on the end surface of the block 4a opposite to the surface thereof to be polished. Subsequently, as shown in FIG. 11B, a protective film 104 is bonded to the polished end surface of the block 4a. The polished end surface of the block 4a is sucked and held by another jig (not shown) with the protective film 104 in between. Thus, the block 4a is sandwiched and held between the fixing jig 100 and another jig on both the end surfaces of the block 4a. Then, the bar 5 having the polished surface is cut away from the adjacent bar 5 by a blade 106. After cutting, the protective film 104 is peeled from the bar 5. Thus, one bar 5 having the polished surface is obtained as shown in FIG. 11C.

Figure 11C:
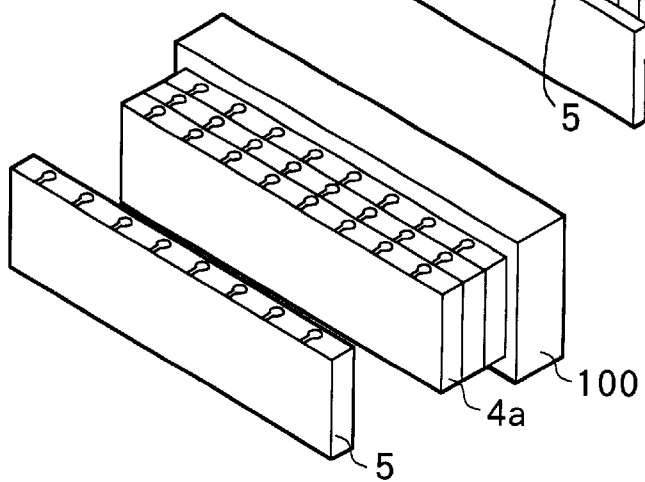

The steps shown in FIGS. 11A to 11C are repeated, whereby the surfaces of all the bars 5 included in the block 4a, i.e., the surfaces corresponding to the air bearing surfaces can be polished and all the bars 5 can be cut from the block 4a. The bars included in the blocks 4b and 4c are polished and cut from the blocks in the same manner as the bars included in the block 4a. Thus, a predetermined number of bars 5 (e.g., fifty bars 5) are obtained.

In the step of polishing shown in FIG. 11A, so-called RLG (Resistance Lapping Guide) polishing for controlling polishing in accordance with measured values of resistance of the thin film magnetic head device 1 changing in accordance with the amount of polishing may be used. Since RLG polishing is well known, the description thereof is omitted. A combination of rough polishing and finish polishing may take place.

A plurality of bars 5 obtained through the above-described steps is arranged and bonded and fixed to the support substrate 90 by the bar fixing apparatus shown in FIG. 6 (step S16).

Figure 12:
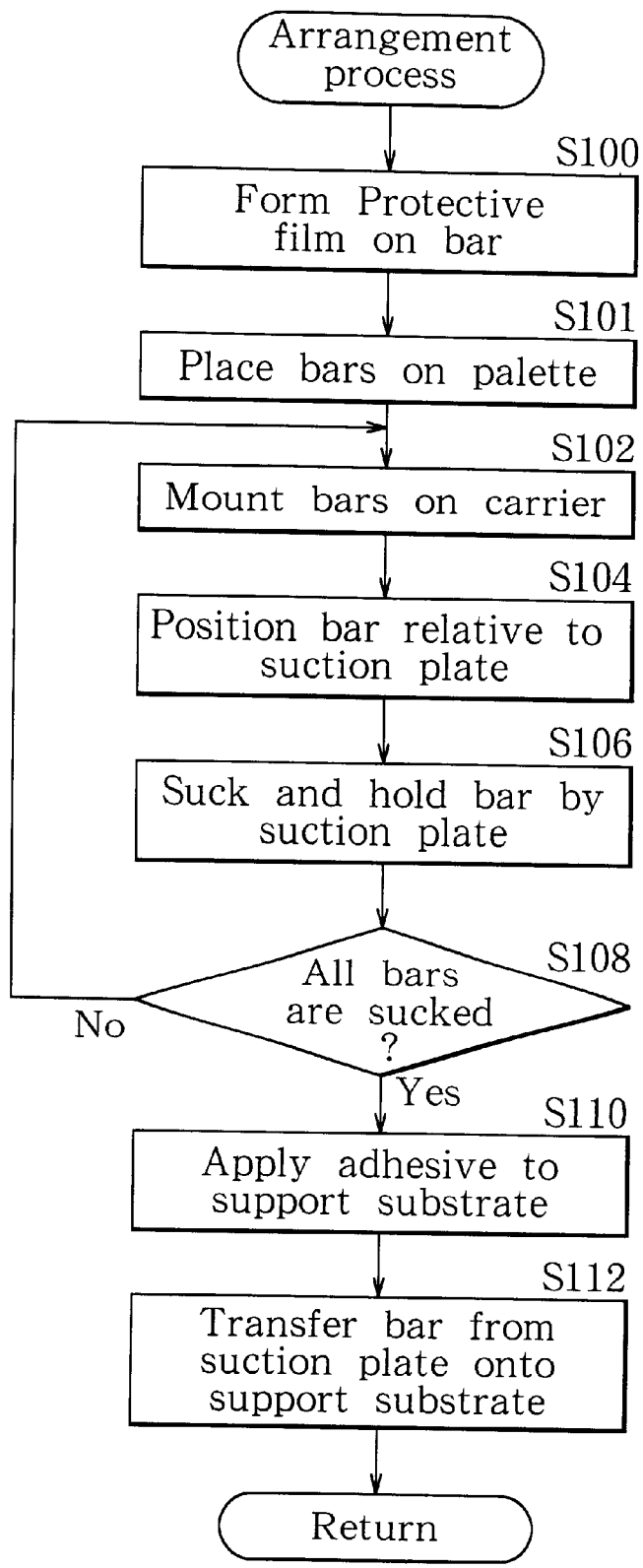
FIG. 12 is a flow chart of the method of fixing a bar in the manufacturing method shown in FIG. 9.
Figure 13:
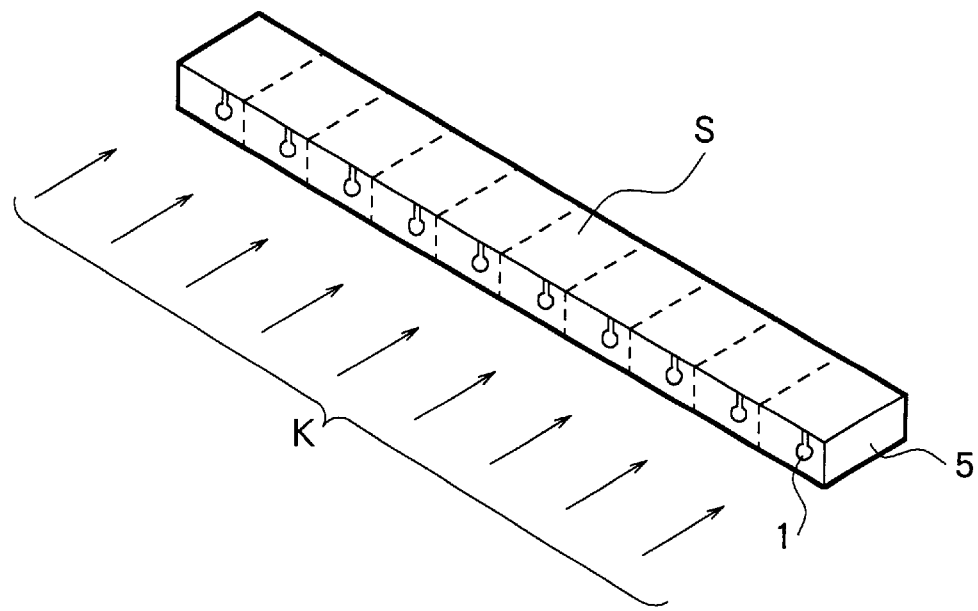
FIG. 13 is a perspective view showing a method of forming a protective film in the method of fixing a bar shown in FIG. 12.
Figure 14:
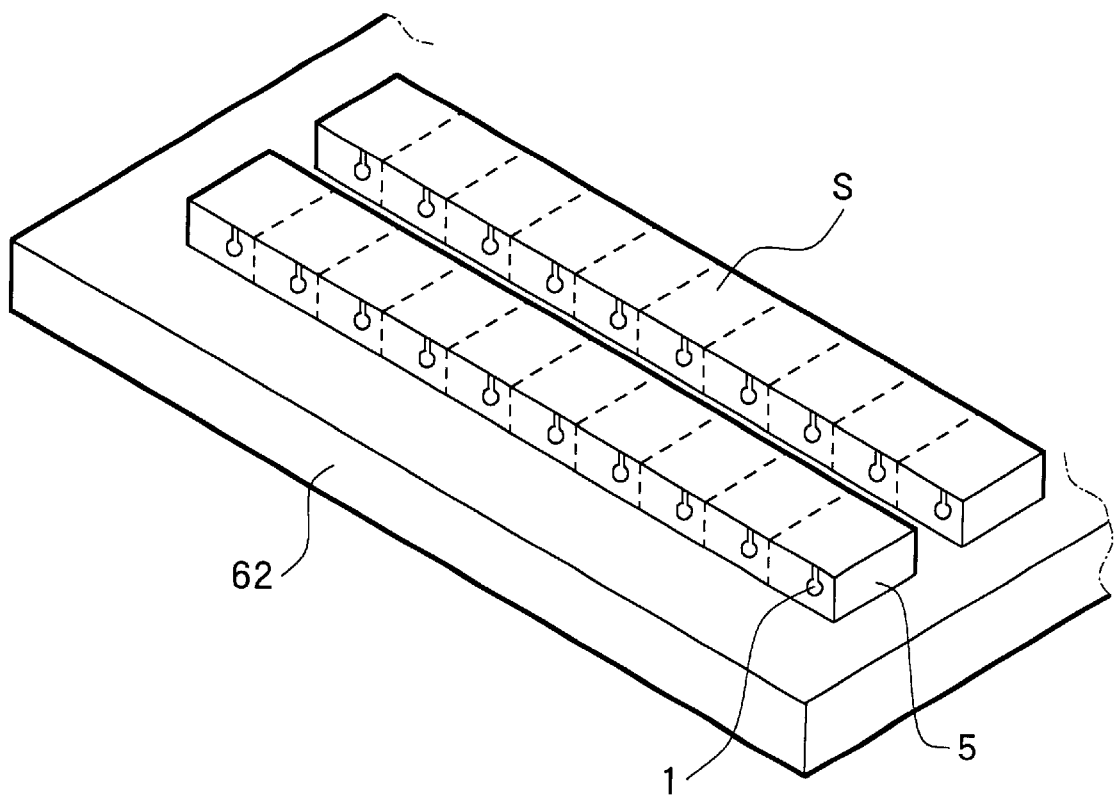
FIG. 14 is a perspective view of a state in which the bars are placed on a palette in the method of fixing a bar shown in FIG. 12.
Figure 17A:
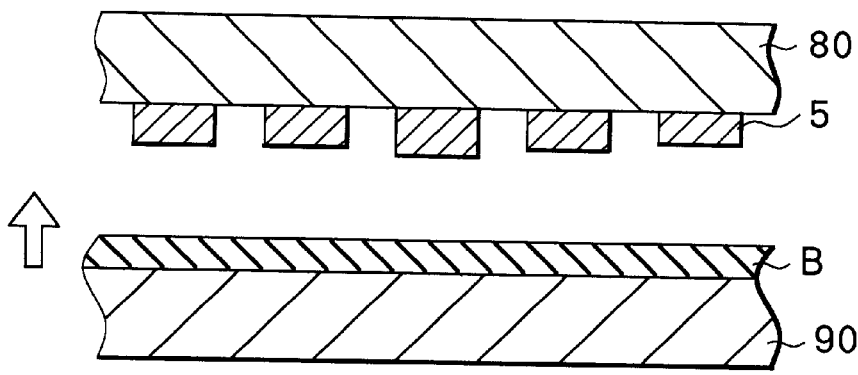
FIGS. 17A to 17C are sectional views of steps for describing a method of transferring a bar in the method of fixing a bar shown in FIG. 12.
Figure 17B:
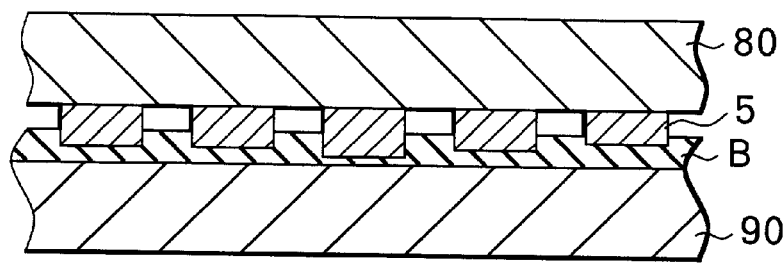
Figure 17C:
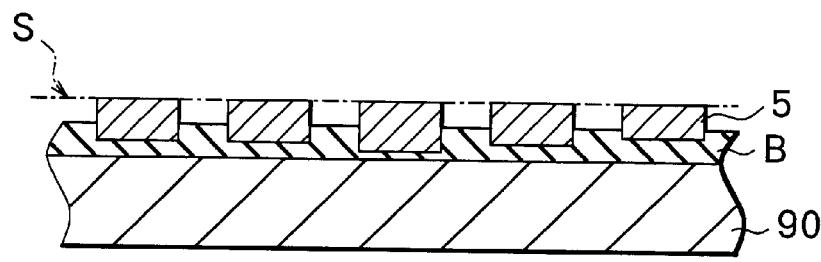

FIG. 12 is a flow chart of arrangement process to be performed in step S16 of FIG. 9. FIG. 13 to FIGS. 16A and 16B are perspective views for describing the arrangement process shown in FIG. 12. FIGS. 17A to 17C are sectional views for describing the arrangement shown in FIG. 12. As shown in FIG. 13, ink (e.g., product number BK2701R made by Domino corporation) is jetted onto the surface of each bar 5 on which the thin film magnetic head devices 1 are formed, as shown by the arrows K. Thus, the protective film for protecting the thin film magnetic head devices 1 is formed (step S100). Then, as shown in FIG. 14, a predetermined number of bars 5 (e.g., fifty bars 5) are placed on the palette 62 with their surfaces corresponding to the air bearing surfaces (i.e., the surfaces indicated by reference symbol S in FIG. 14) upward (step S101). At this time, the bars 5 are arranged in a fixed order (e.g., the same order as the order before cutting the bars 5 from the wafer 4). Position accuracy of each bar 5 on the palette 62 can be such that the position accuracy does not prevent the robot 64 from lifting out each bar 5.

Subsequently, as shown in FIG. 6, the robot 64 is driven so as to lift the bars 5 one by one and move the bars 5 one by one to the carrier 70 (step S102). At this time, the controller C controls the robot 64 so that the robot 64 may lift the bars 5 one by one arranged on the palette 62 in a fixed order (e.g., in the order in which a distance between the robot 64 and the bar 5 increases, the bar S located on the end closest to the robot 64 first) and may move the bars 5 one by one to the carrier 70.

Figure 15:
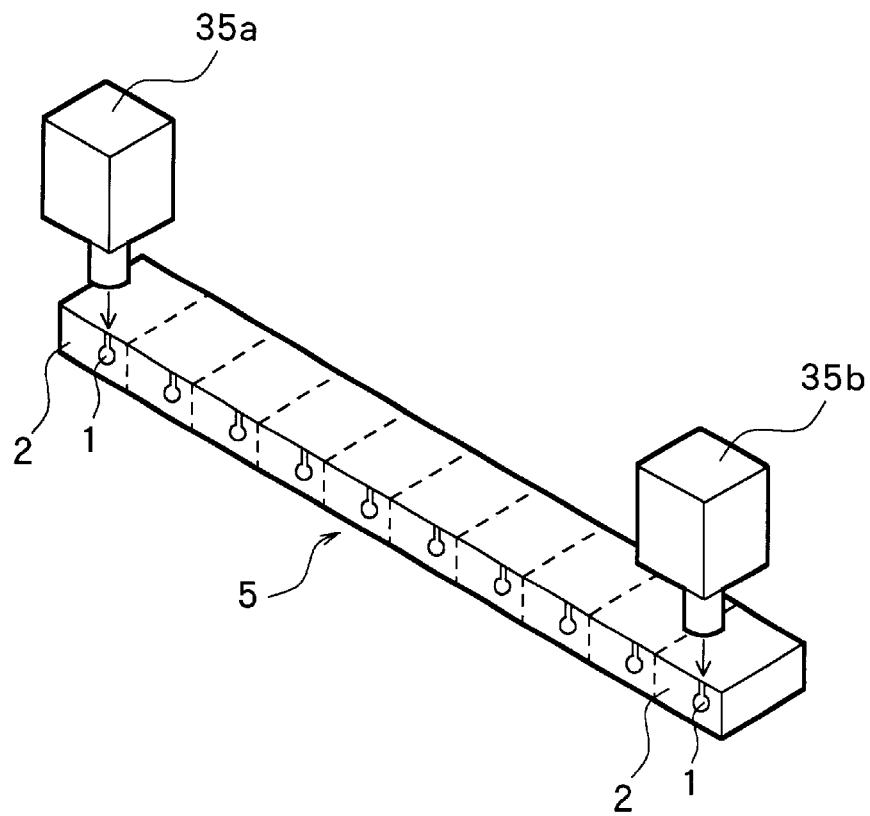
FIG. 15 is a perspective view showing a method of observing a bar in the method of fixing a bar shown in FIG. 12.
Figure 16A:
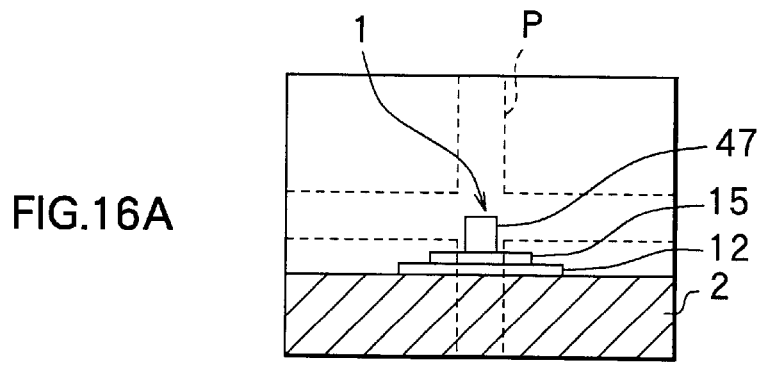
FIGS. 16A and 16B are illustrations of an example of images obtained through the method of observing a bar shown in FIG. 15.
Figure 16B:
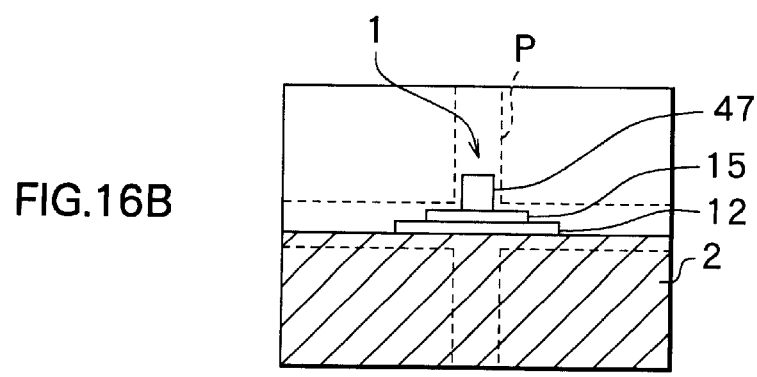

Then, the controller C drives the Y table driving mechanism 756, thereby moving the carrier 70 to the position under the suction plate 80. Then, the controller C drives the lifting mechanism 723, thereby lifting the carrier 70 to the lower surface of the suction plate 80 as closely as possible. In this state, the bar 5 placed on the carrier 70 is positioned relative to the suction plate 80 in the horizontal surface (step S104). As shown in FIG. 15, cameras 35a and 35b located over the suction plate 80 are configured so as to capture image information on the thin film magnetic head devices 1 of the magnetic head sliders 2 located on both ends of the bar 5, e.g., image information shown in FIGS. 16A and 16B. The controller C (see FIG. 6) obtains control information about displacements and inclinations of the bar 5 in the X and Y directions in accordance with displacements of images of the thin film magnetic head devices 1 of the magnetic head sliders 2 located on both ends of the bar 5 from a pattern P previously stored. The controller C drives the X table driving mechanism 752, the Y table driving mechanism 756 and the rotating mechanism 725 in accordance with the control information, thereby positioning the carrier 70 in the horizontal surface.

After the completion of positioning of the carrier 70 relative to the suction plate 80, the controller C drives the valve mechanism 81a, thereby selectively opening the valve 81 for the line of suction holes of the suction plate 80 for sucking the bar 5. At the same time, the controller C drives the valve driving mechanism 71a, thereby closing the valve 71 and thus stopping vacuum suction of the carrier 70. Thus, the bar 5 is separated from the carrier 70 and sucked by the suction plate 80 (step S106). When the bar 5 is sucked by the suction plate 80, the controller C restores the carrier 70 to the position in close proximity to the robot 64. At each time of the completion of suction and holding of one bar 5 by the suction plate 80, the controller C drives the camera driving mechanism 82, thereby moving the cameras 85a and 85b by a pitch of the bars 5.

Placement of the bar 5 on the carrier 70 by the robot 64 (step S102), positioning of the bar 5 by the carrier 70 (step S104) and transfer of the bar 5 from the carrier 70 to the suction plate 80 (step S106) are repeated (step S108). In this case, the number of repetitions is equal to the number of the bars 5. Thus, all of a predetermined number of bars 5 can be sucked by the suction plate 80.

In the above-mentioned manner, a plurality of bars 5 is held by the suction plate 80 with their surfaces corresponding to the air bearing surfaces along the reference plane (the lower surface of the suction plate 80).

Then, the controller C drives the dispenser driving apparatus 95, whereby the dispenser 94 applies the adhesive to the surface of the support substrate 90 (step S110). Desirably, an adhesive having a high setting speed is used as the adhesive. More desirably, a cyanoacrylate adhesive is used. The adhesive may be applied to the overall surface of the support substrate 90, or the adhesive may be applied along a predetermined zigzag pattern, for instance.

Subsequently, the controller C drives the support substrate driving mechanism 98, thereby horizontally moving the support substrate 90 to the position under the suction plate 80 as shown in FIG. 17A, then lifting the support substrate 90 toward the suction plate 80 and thus bringing an adhesive B on the support substrate 90 into contact with the bar 5 held by the suction plate 80. At this time, as shown in FIG. 17B, the adhesive B sets in a state in which the surfaces of the bars 5 to be processed are positioned relative to the lower surface of the suction plate 80. Thus, the thickness of the adhesive B varies according to variations in thicknesses of the bars 5, and therefore the surfaces of all the bars 5 to be processed are located along the reference plane. After the adhesive B sets, suction by the suction plate 80 is stopped. After that, the support substrate 90 is separated from the suction plate 80, whereby the bar 5 is moved from the suction plate 80 onto the support substrate 90 (step S112).

In the above-described manner, a plurality of bars 5 can be arranged on the support substrate 90 with their surfaces to be processed (the surfaces corresponding to the air bearing surfaces) along the reference plane. In other words, heights of the surfaces of a plurality of bars 5 corresponding to the air bearing surfaces (i.e., distances between the surface of the support substrate 90 and the surfaces corresponding to the air bearing surfaces) are identical with one another. A plurality of bars 5 thus arranged and the support substrate 90 are removed from the bar fixing apparatus shown in FIG. 6, and then the bars 5 are loaded into an apparatus for photolithography process.

Figure 18:
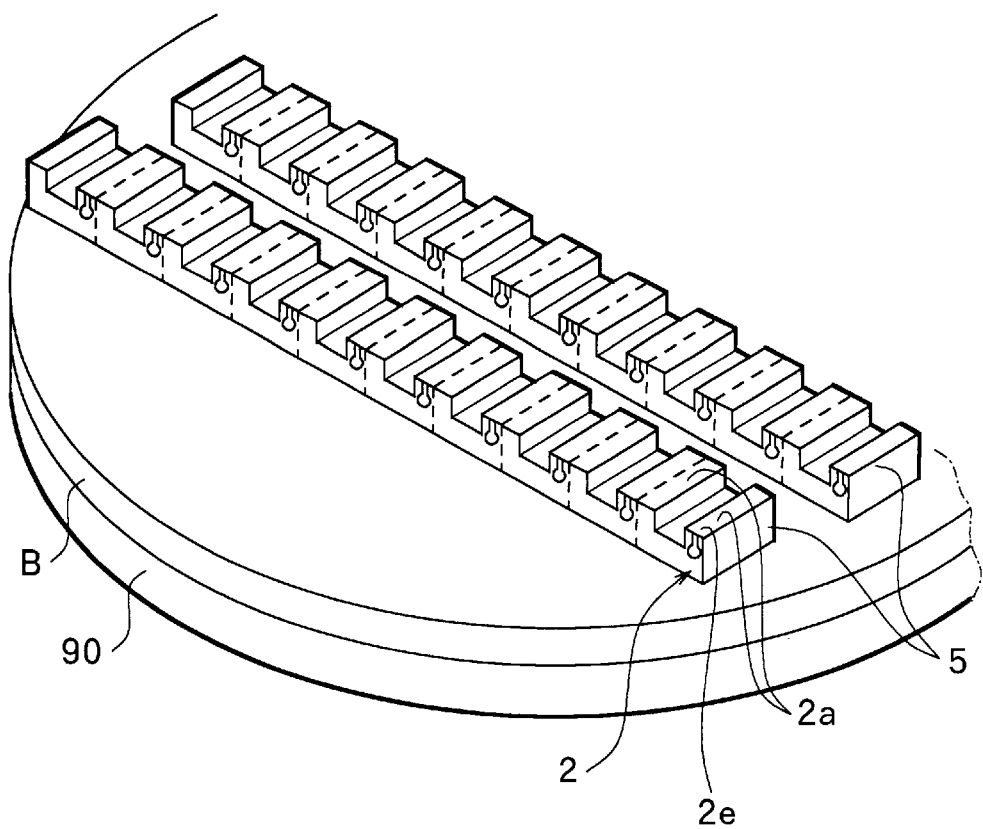
FIG. 18 is a perspective view for describing a method of forming a slider rail in the manufacturing method shown in FIG. 9.

Returning to the flow chart of FIG. 9, the step of forming the rails by photolithography in step S18 is performed. In the step of forming the rails, a dry film resist (not shown) is laminated to the bars 5 arranged on the support substrate 90, and then the bars 5 are exposed to light by using a full wafer aligner (not shown). After the completion of exposure, development is performed by the use of alkali. After etching using ion milling or the like, the resist is removed. In the above-mentioned manner, as shown in FIG. 18, the centers of the magnetic head sliders 2 of each bar are removed. Thus, the slider rail 2a is formed of both sides which the center is sandwiched between, and the air bearing surface 2e is formed of the surface of the slider rail 2a.

At this time, the heights of the surfaces of the bars 5 to be processed (the surfaces corresponding to the air bearing surfaces) exactly match one another. Thus, the surfaces of all the bars 5 to be processed can be precisely brought into exposure focus. Thus, it is possible to eliminate variations in sizes or shapes of the photoresist pattern among the bars. Therefore, the slider rails 2a having a precise shape can be formed.

Figure 19:
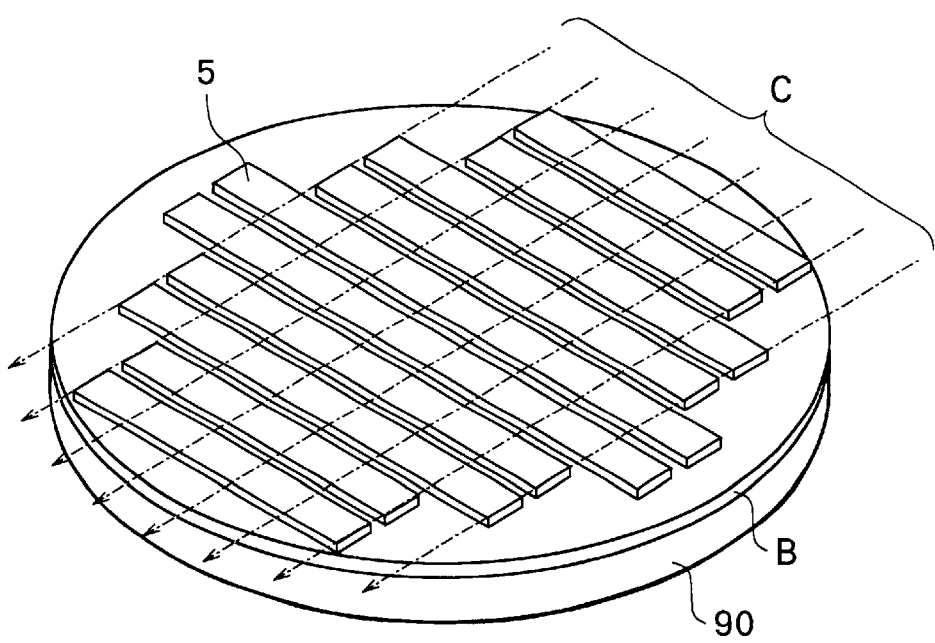
FIG. 19 is a perspective view of steps for describing a method of cutting bars in the manufacturing method shown in FIG. 9.

After forming the slider rails 2a, a plurality of bars 5 supported on the support substrate 90 is cut into the separate magnetic head sliders 2 as shown by the arrows C of FIG. 19 (step S20). Furthermore, the adhesive B is dissolved by the use of a solvent, whereby the magnetic head sliders 2 are separated from the support substrate 90 (step S22). Thus, the magnetic head slider 2 shown in FIG. 2 is obtained. The bars 5 may be individually cut after separating the bars 5 from the support substrate 90 by dissolving the adhesive.

As described above, according to the embodiment, a plurality of bars 5 is arranged with their surfaces to be processed (the surfaces corresponding to the air bearing surfaces) along the reference plane. Thus, all the surfaces to be processed can be precisely brought into exposure focus even if full-wafer printing takes place to form the slider rails 2a. Accordingly, the slider rails 2a having a precise shape can be formed. Moreover, full-wafer printing can be performed by inexpensive equipment, as compared to so-called step-and-repeat exposure for exposing the bars 5 one by one to light. Therefore, manufacturing costs can be reduced. In addition, the bar 5 is positioned in the plane parallel to the suction surface of the suction plate 80. Thus, the bar 5 is not displaced from an exposure pattern for full-wafer printing. Therefore, the slider rails 2a having a precise shape can be formed.

Additionally, the bars 5 are once held by the suction plate 80 having the surface for determining the reference plane, and the bars 5 are transferred to the support substrate 90. Thus, a plurality of bars 5 can be moved to the support substrate 90 at a time. Therefore, the manufacturing time can be reduced.

Furthermore, at the time of transfer of the bars 5, the adhesive is interposed between the surfaces opposite to the surfaces to be processed of a plurality of bars 5 and the support substrate 90. Thus, a plurality of bars 5 can be held with their surfaces to be processed along the reference plane.

Furthermore, the bar 5 is positioned relative to the reference plane concurrently with observation of the thin film magnetic head devices 1 of the magnetic head sliders 2 located on both ends of the bar 5. Therefore, the position of each bar 5 can be precisely matched to the position of the exposure pattern for the step of forming the rails by using photolithography, for example.

Moreover, the protective film is formed on the surface of the bar 5 on which the thin film magnetic head devices 1 are formed. Therefore, the thin film magnetic head devices 1 can be protected from damage due to etching for photolithography, for example.

Furthermore, in the embodiment, a plurality of types of bars 5 having different lengths is cut from one wafer 4. Thus, the wafer 4 can be efficiently used, and therefore a waste of materials can be reduced.

The invention is not limited to the above-described embodiment and various modifications of the invention are possible. In the above-described embodiment, fifty bars 5 each are fixed to the support substrate 90. However, any number of the bars 5 may be fixed to the support substrate 90. Moreover, the invention can be applied to any process other than the process of forming the rails by using photolithography. For example, the invention may be applied to polishing called RLG polishing, or the like.

Moreover, the thin film magnetic head device 1 is not limited to a device using an AMR film or a GMR film. The thin film magnetic head device 1 may be a device using other MR films (e.g., a TMR (tunnel-type magnetoresistive) film). Moreover, the thin film magnetic head device may be a reproduce-only head or a record-only head.

As described above, according to a method of fixing bars of the invention or a method of manufacturing a magnetic head slider of the invention, a plurality of bars is positioned relative to their surfaces to be processed. Thus, the surfaces to be processed of all the bars can be in the same surface. Furthermore, a plurality of bars is positioned in the plane parallel to the reference plane. Thus, the exposure pattern can be precisely aligned with the bar in the step of photolithography, for example. An effect of obtaining a precise shape is therefore achieved.

According to a method of fixing bars of the invention or a method of manufacturing a magnetic head slider of the invention, the surfaces to be processed of all the bars can be in the same surface to form the slider rail or the like by photolithography. Thus, the surfaces to be processed of the bars can be easily brought into exposure focus, and therefore fabrication accuracy is improved. Accordingly, properties of the magnetic head slider (e.g., a clearance between the magnetic head slider and the recording medium, and so on) can be kept constant. Moreover, full-wafer printing for, for example, photolithography, or the like can take place. Thus, the time required for manufacturing is reduced. In addition, full-wafer printing does not need an expensive stepper and thus can reduce manufacturing costs, as distinct from, for example, step-and-repeat exposure for exposing the bars one by one to light.

According to a method of fixing bars of the invention or a method of manufacturing a magnetic head slider of the invention, the adhesive is interposed between the surfaces opposite to the surfaces to be processed of the bars and the support member. Thus, a plurality of bars can be easily held by the support member with the surfaces to be processed of the bars aligned with the reference plane.

According to a method of fixing bars of the invention or a method of manufacturing a magnetic head slider of the invention, the surfaces to be processed of a plurality of bars are brought into direct contact with the reference plane of the reference member, and a plurality of bars is held by the reference member. Thus, the surfaces of a plurality of bars to be processed can be aligned with the reference plane by a simple method.

According to a method of fixing bars of the invention or a method of manufacturing a magnetic head slider of the invention, a plurality of bars is held by sucking means of the reference member. Thus, the bars can be held by a simple method.

According to a method of fixing bars of the invention or a method of manufacturing a magnetic head slider of the invention, the surfaces opposite to the surfaces to be processed of a plurality of bars held by the reference member are pressed against the adhesive applied to the support member, and, in this state, the adhesive is allowed to set. Thus, the thickness of the adhesive varies according to variations in thicknesses of the bars. As a result, the surfaces of a plurality of bars to be processed can be aligned with the reference plane.

According to a method of fixing bars of the invention or a method of manufacturing a magnetic head slider of the invention, the bars are positioned in a plane parallel to the reference plane concurrently with observation of a predetermined mark formed on each of the bars. Thus, the exposure pattern for, for example, photolithography can be precisely aligned with the surface of each bar to be processed.

According to a method of fixing bars of the invention or a method of manufacturing a magnetic head slider of the invention, the protective film is formed on at least one surface of the bar except the surface thereof to be processed. Thus, for example, the thin film magnetic head device can be protected from damage due to the process (e.g., etching for photolithography).

According to a method of fixing bars of the invention or a method of manufacturing a magnetic head slider of the invention, a plurality of types of bars having different lengths is formed. Thus, the bars can be efficiently cut from, for example, a disc-shaped wafer, and therefore a waste of materials can be reduced.

Obviously many modifications and variations of the present invention are possible in the light of the above teachings. It is therefore to be understood that within the scope of the appended claims the invention may be practiced otherwise than as specifically described.

What is claimed is:

1. A method of fixing bars to a support member, each of the bars having at least one magnetic head slider and first and second surfaces that oppose each other, the first surface being a processing surface, the method comprising:
    arranging a plurality of bars so that a processing surface of each of the bars is disposed on a reference plane including:
        bringing the first surface of each of the plurality of bars into direct contact with a reference surface of a reference member, the reference surface of the reference member being the reference plane and the reference surface being flat, and
        holding the plurality of bars by the reference member; and
    transferring the plurality of bars onto the support member while maintaining a relative position of each of the bars,
    wherein, in the step of arranging, a position of each bar is adjusted in a plane parallel to the reference plane.

2. The method of fixing bars according to claim 1, wherein the first surface of each of the bars is an air bearing surface of a magnetic head slider, the air bearing surface facing a recording medium.

3. The method of fixing bars according to claim 1, wherein the bars are processed using photolithography.

4. The method of fixing bars according to claim 1, wherein, in the step of transferring, each of the bars is fixed to the support member by applying an adhesive between the second surface of each of the plurality of bars and the member.

5. The method of fixing bars according to claim 1, wherein the reference member includes a sucking means, and in the step of holding, the plurality of bars is held by the sucking means.

6. The method of fixing bars according to claim 1, wherein the step of transferring further includes:
    applying an adhesive onto the support member;
    bringing the second surface of each of the plurality of bars held by the reference member into contact with the adhesive; and
    separating the reference member from the plurality of bars after the adhesive sets.

7. The method of fixing bars according to claim 1, wherein, in the step of arranging, the plurality of bars is carried, one by one, by using a carrier capable of moving relative to the reference plane in the plane parallel to the reference plane.

8. The method of fixing bars according to claim 1, wherein, in the step of arranging, the position of each of the plurality of bars is adjusted in the plane parallel to the reference plane concurrently with observation of a predetermined mark formed on each of the bars.

9. The method of fixing bars according to claim 1, further including, prior to the step of arranging, a step of forming a protective film on at least one surface of each bar, except for the first surface of the bars.

10. The method of fixing bars according to claims 1, wherein the plurality of bars includes various types of bars having different lengths.

11. A method of manufacturing a magnetic head slider, comprising the steps of:
    forming thin film magnetic head devices on a predetermined base;
    cutting the base into a plurality of bars, each of which has first and second surfaces that oppose each other and includes at least one magnetic head slider on which a thin film magnetic head device is formed, the first surface being a processing surface subjected to a process;
    arranging the plurality of bars in a manner that the first surface corresponds to a reference plane including:
        bringing the first surface into direct contact with a reference surface of a reference member, the reference surface of the reference member functioning as the reference plane and the reference-surface being flat, and
        holding the plurality of bars by the reference member;
    transferring the plurality of bars arranged by the step of arranging onto a support member while maintaining relative positions of the bars;
    applying the process to the plurality of bars supported by the support member; and
    separating each of the bars into magnetic head sliders by cutting the bars,
    wherein, in the step of arranging, a position of each of the plurality of bars is adjusted in a plane parallel to the reference plane.

12. The method of manufacturing a magnetic head slider according to claim 11, wherein the first surface is an air bearing surface of the magnetic head slider, the air bearing surface facing a recording medium.

13. The method of manufacturing a magnetic head slider according to claim 11, wherein the process includes a process using photolithography.

14. The method of manufacturing a magnetic head slider according to claim 11, wherein, in the step of transferring, an adhesive is interposed between the second surface and the support member.

15. The method of manufacturing a magnetic head slider according to claim 11, wherein the reference member includes a sucking means, and in the step of holding, the plurality of bars is held by the sucking means.

16. The method of manufacturing a magnetic head slider according to claim 11, wherein the step of transferring further includes the steps of:
applying an adhesive to the support member;
bringing the second surface of the plurality of bars held by the reference member into contact with the adhesive; and
separating the reference member from the plurality of bars after the adhesive sets.

17. The method of manufacturing a magnetic head slider according to claim 11, wherein, in the step of arranging, a carrier that carries the plurality of bars one by one is used, and the carrier is capable of moving relative to the reference plane in the plane parallel to the reference plane.

18. The method of manufacturing a magnetic head slider according to claim 11, wherein, in the step of arranging, the position of each of the plurality of bars is adjusted in the plane parallel to the reference plane concurrently with observation of a predetermined mark formed on each of the bars.

19. The method of manufacturing a magnetic head slider according to claim 11, further including, prior to the step of arranging, the step of forming a protective film on at least one surface of each bar, except the processing surface.

20. The method of manufacturing a magnetic head slider according to claim 11, wherein, in the step of cutting, various types of bars having different lengths are cut from the base.

21. A method of fixing bars to a predetermined support member in order to apply a process to predetermined surfaces of the bars, each of the bars having first and second surfaces that face each other, the first surface being a processing surface subjected to the process, the bars being long members each of which includes at last one magnetic head slider, comprising:
arranging a plurality of bars in a manner that the first surface corresponds to a predetermined reference plane including:
bringing the first surface of each of the plurality of bars into direct contact with a reference surface of a reference member, the reference surface of the reference member being the reference plane and the reference surface being flat; and
holding the plurality of bars by the reference member; and
transferring the plurality of bars arranged by the step of arranging onto the support member while maintaining relative positions of the bars,
wherein the step of arranging includes steps of:
adjusting a position of each of the plurality of bars in a plane parallel to the reference plane, and
fixing each of the plurality of bars adjusted.

22. A method of manufacturing a magnetic head slider, comprising:
forming thin film magnetic head devices on a predetermined base;
cutting the base into a plurality of bars, each of which has first and second surfaces facing each other and includes at least one magnetic head slider on which a thin film magnetic head device is formed, the first surface being a processing surface subjected to a process;
arranging the plurality of bars in a manner that the first surface corresponds to a reference plane including:
bringing the first surface into direct contact with a reference surface of a reference member, the reference surface of the reference member functioning as the reference plane and the reference surface being flat; and
holding the plurality of bars by the reference member;
transferring the plurality of bars arranged by the step of arranging onto a support member while maintaining relative positions of the bars;
applying a process to the plurality of bars supported by the support member; and
separating each of the bars into magnetic head sliders by cutting the bars,
wherein the step of arranging includes steps of:
adjusting a position of each of the plurality of bars in a plane parallel to the reference plane, and
fixing each of the plurality of bars adjusted.

23. A method of fixing bars to a support member, each of the bars having at least one magnetic head slider and first and second surfaces that oppose each other, the first surface being a processing surface, the method comprising:
arranging a plurality of bars so that a processing surface of each of the bars is disposed on a reference plane of a reference member having a reference surface, wherein the reference surface is flat; and
transferring the plurality of bars onto the support member while maintaining a relative position of each of the bars,
wherein, in the step of arranging, a position of each bar is adjusted in a plane parallel to the reference plane.

24. A method of manufacturing a magnetic head slider, comprising the steps of:
forming thin film magnetic head devices on a predetermined base;
cutting the base into a plurality of bars, each of which has first and second surfaces that oppose each other and includes at least one magnetic head slider on which a thin film magnetic head device is formed, the first surface being a processing surface subjected to a process;
arranging the plurality of bars in a manner that the first surface corresponds to a reference plane of a reference member having a reference surface, wherein the reference surface is flat;
transferring the plurality of bars arranged by the step of arranging onto a support member while maintaining relative positions of the bars;
applying the process to the plurality of bars supported by the support member; and
separating each of the bars into magnetic head sliders by cutting the bars,
wherein, in the step of arranging, a position of each of the plurality of the bars is adjusted in a plane parallel to the reference plane.

25. A method of fixing bars to a predetermined support member in order to apply a process to predetermined surfaces of the bars, each of the bars having first and second surfaces that face each other, the first surface being a processing surface subjected to the process, the bars being long members each of which includes at least one magnetic head slider, comprising:

arranging a plurality of bars in a manner that the first surface corresponds to a reference plane of a reference member having a reference surface, wherein the reference surface is flat; and transferring the plurality of bars arranged by the step of arranging onto the support member while maintaining relative positions of the bars, wherein the step of arranging includes steps of:
adjusting a position of each of the plurality of bars in a plane parallel to the reference plane, and
fixing each of the plurality of bars adjusted.

26. A method of manufacturing a magnetic head slider comprising:

forming thin film magnetic head devices on a predetermined base;

cutting the base into a plurality of bars, each of which has first and second surfaces facing each other and includes at least one magnetic head slider on which a thin film magnetic head device is formed, the first surface being a processing surface subjected to a process;

arranging the plurality of bars in a manner that the first surface corresponds to a reference plane of a reference member having a reference surface, wherein the reference surface is flat;

transferring the plurality of bars arranged by the step of arranging onto a support member while maintaining relative positions of the bars;

applying a process to the plurality of bars supported by the support member; and separating each of the bars into magnetic head sliders by cutting the bars, wherein the step of arranging includes steps of:
adjusting a position of each of the plurality of bars in a plane parallel to the reference plane, and
fixing each of the plurality of bars adjusted.

* * * * *